(12) United States Patent
Chuan et al.

(10) Patent No.: US 6,942,395 B1
(45) Date of Patent: Sep. 13, 2005

(54) METHOD AND APPARATUS OF PULL-LEVER RELEASE FOR FIBER OPTIC MODULES

(75) Inventors: Ron Pang Cheng Chuan, Singapore (SG); Sim Yong Peng, Singapore (SG)

(73) Assignee: JDS Uniphase Corporation, San Jose, CA (US)

( * ) Notice: Subject to any disclaimer, the term of this patent is extended or adjusted under 35 U.S.C. 154(b) by 245 days.

(21) Appl. No.: 10/056,394

(22) Filed: Jan. 24, 2002

Related U.S. Application Data

(60) Provisional application No. 60/265,182, filed on Jan. 29, 2001, and provisional application No. 60/265,374, filed on Jan. 30, 2001.

(51) Int. Cl.[7] .................................................. G02B 6/36
(52) U.S. Cl. ............................................................. 385/53
(58) Field of Search ........................... 385/53, 60, 97, 385/90; 439/577, 65, 357, 76.1, 92, 95

(56) References Cited

U.S. PATENT DOCUMENTS

| | | | |
|---|---|---|---|
| 1,835,251 | A | 12/1931 | Wetstein |
| 1,899,360 | A | 2/1933 | Roudebush et al. |
| 2,384,267 | A | 9/1945 | Andersen |
| 2,714,195 | A | 7/1955 | Beatty |

(Continued)

FOREIGN PATENT DOCUMENTS

| | | |
|---|---|---|
| DE | 2 297 007 A | 7/1996 |
| JP | 07-225327 | 8/1995 |
| JP | 07-225328 | 8/1995 |
| WO | WO 95/12227 | 5/1995 |

OTHER PUBLICATIONS

US 6,554,622, 4/2003, Engel et al. (withdrawn)
N. R. Basavanhally, et al., "Optoeslectronic Packaging", Chapter 2, Communication System Interconnection Structure, pps. 11–23, 38–43, John Wiley & Sons, Inc. New York.
Shinichi Sasaki et al., "A Compact Optical Active Connector: An Optical Interconnect Module with an Electrical Connector Interface," IEEE Transactions on Advanced Packaging, vol. 22, No. 4, Nov. 1999.

*Primary Examiner*—J. F. Duverne

(74) *Attorney, Agent, or Firm*—Allen, Dyer, Doppelt, Milbrath & Gilchrist, P.A.

(57) ABSTRACT

A fiber optic module having a pull-lever actuator to unplug it from a cage or a module receptacle. In one embodiment, the pull-lever actuator includes a pull grip, a de-latching arm, and an electromagnetic interference (EMI) shield with grounding tabs to couple to the cage or module receptacle to connect to ground. The pull-lever actuator makes it easy to de-latch and unplug a fiber optic module from the cage or module receptacle.

35 Claims, 40 Drawing Sheets

U.S. PATENT DOCUMENTS

| | | |
|---|---|---|
| 2,760,174 A | 8/1956 | Burtt et al. |
| 2,767,008 A | 10/1956 | Oswald |
| 2,872,139 A | 2/1959 | Bedford, Jr. |
| 2,881,404 A | 4/1959 | Kamm |
| 2,899,669 A | 8/1959 | Johanson |
| 3,017,232 A | 1/1962 | Schwab et al. |
| 3,035,243 A | 5/1962 | Bowling |
| 3,311,863 A | 3/1967 | Beale |
| 3,398,390 A | 8/1968 | Long |
| 3,408,614 A | 10/1968 | Kuwahata |
| 3,451,034 A | 6/1969 | Beale |
| 3,476,258 A | 11/1969 | Dorsett |
| 3,495,206 A | 2/1970 | Pfister |
| 3,518,612 A | 6/1970 | Dunman et al. |
| 3,566,190 A | 2/1971 | Huebner et al. |
| 3,566,336 A | 2/1971 | Johnson et al. |
| 3,576,515 A | 4/1971 | Frantz |
| 3,594,698 A | 7/1971 | Anhalt |
| 3,668,605 A | 6/1972 | Albert |
| 3,736,471 A | 5/1973 | Donze et al. |
| 3,767,974 A | 10/1973 | Donovan, Jr. et al. |
| 3,784,954 A | 1/1974 | Grimm et al. |
| 3,798,507 A | 3/1974 | Damon et al. |
| 3,803,409 A | 4/1974 | Prochazka |
| 3,806,225 A | 4/1974 | Codrino |
| 3,809,908 A | 5/1974 | Clanton |
| 3,915,538 A | 10/1975 | Gruhn, Jr. et al. |
| 3,950,059 A | 4/1976 | Anhalt et al. |
| 3,951,514 A | 4/1976 | Medina, Jr. |
| 3,952,232 A | 4/1976 | Coules |
| 4,045,109 A | 8/1977 | Langenbach et al. |
| 4,064,551 A | 12/1977 | Lightfoot |
| 4,070,081 A | 1/1978 | Takahashi |
| 4,083,616 A | 4/1978 | McNiece et al. |
| 4,083,619 A | 4/1978 | McCormick et al. |
| 4,084,882 A | 4/1978 | Hogan et al. |
| 4,140,367 A | 2/1979 | Makuch et al. |
| 4,149,072 A | 4/1979 | Smith et al. |
| 4,152,038 A | 5/1979 | Inouye et al. |
| 4,167,303 A | 9/1979 | Bowen et al. |
| 4,197,572 A | 4/1980 | Aimar |
| 4,217,030 A | 8/1980 | Howarth |
| 4,226,491 A | 10/1980 | Kazama et al. |
| 4,233,646 A | 11/1980 | Leung et al. |
| 4,243,283 A | 1/1981 | McSparran |
| 4,260,210 A | 4/1981 | Babuka et al. |
| 4,268,114 A | 5/1981 | dAuria et al. |
| 4,273,413 A | 6/1981 | Bendiksen et al. |
| 4,295,181 A | 10/1981 | Chang et al. |
| 4,301,494 A | 11/1981 | Jordan |
| 4,313,150 A | 1/1982 | Chu |
| 4,377,318 A | 3/1983 | Long |
| 4,384,368 A | 5/1983 | Rosenfeldt et al. |
| 4,387,956 A | 6/1983 | Cline |
| 4,398,073 A | 8/1983 | Botz et al. |
| 4,406,514 A | 9/1983 | Hillegonds et al. |
| 4,410,222 A | 10/1983 | Enomoto et al. |
| 4,427,879 A | 1/1984 | Becher et al. |
| 4,432,604 A * | 2/1984 | Schwab .................. 385/60 |
| 4,439,006 A | 3/1984 | Stevenson |
| 4,445,740 A | 5/1984 | Wallace |
| 4,448,467 A | 5/1984 | Weidler |
| 4,449,784 A | 5/1984 | Basov et al. |
| 4,460,230 A | 7/1984 | McKee et al. |
| 4,470,660 A | 9/1984 | Hillegonds et al. |
| 4,477,133 A | 10/1984 | Cosmo |
| 4,477,146 A | 10/1984 | Bowen et al. |
| 4,491,981 A | 1/1985 | Weller et al. |
| 4,522,463 A | 6/1985 | Schwenda et al. |
| 4,526,427 A | 7/1985 | Boll et al. |
| 4,527,285 A | 7/1985 | Kekas et al. |
| 4,541,036 A | 9/1985 | Landries et al. |
| 4,548,467 A | 10/1985 | Stoerk et al. |
| 4,553,813 A | 11/1985 | McNaughton et al. |
| 4,553,814 A | 11/1985 | Bahl et al. |
| 4,611,887 A | 9/1986 | Glover et al. |
| 4,619,493 A | 10/1986 | Kikuta |
| 4,678,264 A | 7/1987 | Bowen et al. |
| 4,684,210 A | 8/1987 | Matsunaga et al. |
| 4,699,438 A | 10/1987 | Kikuta |
| 4,699,455 A | 10/1987 | Erbe et al. |
| 4,734,049 A | 3/1988 | George et al. |
| 4,737,008 A | 4/1988 | Ohyama et al. |
| 4,756,593 A | 7/1988 | Koakutsu et al. |
| 4,762,388 A | 8/1988 | Tanaka et al. |
| 4,767,179 A | 8/1988 | Sampson et al. |
| 4,779,950 A | 10/1988 | Williams |
| 4,787,706 A | 11/1988 | Cannon, Jr. et al. |
| 4,789,218 A | 12/1988 | Paul et al. |
| 4,798,430 A | 1/1989 | Johnson et al. |
| 4,798,440 A | 1/1989 | Hoffer et al. |
| 4,821,145 A | 4/1989 | Corfits et al. |
| 4,838,810 A | 6/1989 | Yoshimura et al. |
| 4,840,451 A | 6/1989 | Sampson et al. |
| 4,861,134 A | 8/1989 | Alameel et al. |
| 4,872,736 A | 10/1989 | Myers et al. |
| 4,900,263 A | 2/1990 | Manassero et al. |
| 4,906,197 A | 3/1990 | Noll |
| 4,944,568 A | 7/1990 | Danbach et al. |
| 4,960,317 A | 10/1990 | Briggs et al. |
| 4,969,924 A | 11/1990 | Suverison et al. |
| 4,986,625 A | 1/1991 | Yamada et al. |
| 4,991,062 A | 2/1991 | Nguyenngoc |
| 4,995,821 A | 2/1991 | Casey |
| 4,997,386 A | 3/1991 | Kawachi et al. |
| 5,005,939 A | 4/1991 | Arvanitakis et al. |
| 5,011,425 A | 4/1991 | VanZanten et al. |
| 5,013,247 A | 5/1991 | Watson |
| 5,016,968 A | 5/1991 | Hammond et al. |
| 5,021,003 A | 6/1991 | Ohtaka et al. |
| 5,039,194 A | 8/1991 | Block et al. |
| 5,042,891 A | 8/1991 | Mulholland et al. |
| 5,044,982 A | 9/1991 | Bertini |
| 5,062,806 A | 11/1991 | Ohno et al. |
| 5,067,785 A | 11/1991 | Schirbl et al. |
| 5,071,219 A | 12/1991 | Yurtin et al. |
| 5,073,045 A | 12/1991 | Abendschein |
| 5,073,046 A | 12/1991 | Edwards et al. |
| 5,076,656 A | 12/1991 | Briggs et al. |
| 5,082,344 A | 1/1992 | Mulholland et al. |
| 5,083,931 A | 1/1992 | Davidge et al. |
| 5,084,802 A | 1/1992 | Nguyenngoc |
| 5,091,991 A | 2/1992 | Briggs et al. |
| 5,099,307 A | 3/1992 | Go et al. |
| 5,101,463 A | 3/1992 | Cubukciyan et al. |
| 5,104,243 A | 4/1992 | Harding |
| 5,109,453 A | 4/1992 | Edwards et al. |
| 5,113,467 A | 5/1992 | Peterson et al. |
| 5,116,239 A | 5/1992 | Siwinski |
| 5,117,476 A | 5/1992 | Yingst et al. |
| 5,118,904 A | 6/1992 | Nguyenngoc |
| 5,125,849 A | 6/1992 | Briggs et al. |
| 5,134,679 A | 7/1992 | Robin et al. |
| 5,138,678 A | 8/1992 | Briggs et al. |
| 5,140,663 A | 8/1992 | Edwards et al. |
| 5,142,597 A | 8/1992 | Mulholland et al. |
| 5,155,786 A | 10/1992 | Ecker et al. |
| 5,159,652 A | 10/1992 | Grassin D'Alphonse et al. |
| 5,163,109 A | 11/1992 | Okugawa et al. |
| 5,163,847 A | 11/1992 | Regnier |
| 5,183,404 A | 2/1993 | Aldous et al. |

| Patent | Date | Inventor |
|---|---|---|
| 5,195,897 A | 3/1993 | Kent et al. |
| 5,195,911 A | 3/1993 | Murphy |
| 5,199,093 A | 3/1993 | Longhurst |
| 5,204,929 A | 4/1993 | Machall et al. |
| 5,212,681 A | 5/1993 | Bock et al. |
| 5,212,761 A | 5/1993 | Petrunia |
| 5,218,519 A | 6/1993 | Welch et al. |
| 5,234,353 A | 8/1993 | Scholz et al. |
| 5,238,426 A | 8/1993 | Arnett |
| 5,243,678 A | 9/1993 | Schaffer et al. |
| 5,247,427 A | 9/1993 | Driscoll et al. |
| 5,253,320 A | 10/1993 | Takahashi et al. |
| 5,256,080 A | 10/1993 | Bright |
| 5,259,052 A | 11/1993 | Briggs et al. |
| 5,262,923 A | 11/1993 | Batta et al. |
| 5,274,729 A | 12/1993 | King et al. |
| 5,283,680 A | 2/1994 | Okugawa et al. |
| 5,286,207 A | 2/1994 | McHugh |
| 5,289,345 A | 2/1994 | Corradetti et al. |
| 5,295,212 A | 3/1994 | Morton et al. |
| 5,315,679 A | 5/1994 | Baldwin et al. |
| 5,317,663 A | 5/1994 | Beard et al. |
| 5,325,454 A | 6/1994 | Rittle et al. |
| 5,325,455 A | 6/1994 | Henson et al. |
| 5,329,428 A | 7/1994 | Block et al. |
| 5,329,604 A | 7/1994 | Baldwin et al. |
| 5,333,221 A | 7/1994 | Briggs et al. |
| 5,337,396 A | 8/1994 | Chen et al. |
| 5,361,318 A | 11/1994 | Go et al. |
| 5,363,465 A | 11/1994 | Korkowski et al. |
| D353,796 S | 12/1994 | Oliver et al. |
| D354,271 S | 1/1995 | Speiser et al. |
| 5,383,793 A | 1/1995 | Hsu et al. |
| 5,386,346 A | 1/1995 | Gleadall |
| 5,390,268 A | 2/1995 | Morlion et al. |
| 5,398,295 A | 3/1995 | Chang et al. |
| 5,411,402 A | 5/1995 | Bethurum |
| 5,412,497 A | 5/1995 | Kaetsu et al. |
| 5,425,646 A | 6/1995 | Green |
| 5,442,726 A | 8/1995 | Howard et al. |
| 5,452,388 A | 9/1995 | Rittle et al. |
| 5,463,532 A | 10/1995 | Petitpierre et al. |
| 5,469,526 A | 11/1995 | Rawlings |
| 5,470,238 A | 11/1995 | Walden |
| 5,481,634 A | 1/1996 | Anderson et al. |
| 5,487,678 A | 1/1996 | Tsuji et al. |
| 5,491,613 A | 2/1996 | Petitpierre |
| 5,515,468 A | 5/1996 | DeAndrea et al. |
| 5,528,408 A | 6/1996 | McGinley et al. |
| 5,546,281 A | 8/1996 | Poplawski et al. |
| 5,548,677 A | 8/1996 | Kakii et al. |
| 5,561,727 A | 10/1996 | Akita et al. |
| 5,583,745 A | 12/1996 | Uwabo et al. |
| 5,596,663 A | 1/1997 | Ishibashi et al. |
| 5,600,470 A | 2/1997 | Walsh |
| 5,654,873 A | 8/1997 | Smithson et al. |
| 5,659,459 A | 8/1997 | Wakabayashi et al. |
| D389,802 S | 1/1998 | Vernon |
| 5,717,533 A | 2/1998 | Poplawski et al. |
| 5,734,558 A | 3/1998 | Poplawski et al. |
| 5,738,538 A | 4/1998 | Bruch et al. |
| 5,757,998 A | 5/1998 | Thatcher et al. |
| 5,766,027 A | 6/1998 | Fogg |
| 5,767,999 A | 6/1998 | Kayner |
| 5,797,771 A | 8/1998 | Garside |
| 5,820,398 A | 10/1998 | Stabroth et al. |
| 5,829,996 A | 11/1998 | Yamane et al. |
| 5,864,468 A | 1/1999 | Poplawski et al. |
| 5,865,646 A | 2/1999 | Ortega et al. |
| 5,879,173 A | 3/1999 | Poplawski et al. |
| 5,896,480 A | 4/1999 | Scharf et al. |
| 5,901,263 A | 5/1999 | Gaio et al. |
| 5,931,290 A | 8/1999 | Wehrli, III et al. |
| 5,966,487 A | 10/1999 | Gilliland et al. |
| 5,980,324 A | 11/1999 | Berg et al. |
| 6,047,172 A | 4/2000 | Babineau et al. |
| 6,052,278 A | 4/2000 | Tanzer et al. |
| 6,062,893 A | 5/2000 | Miskin et al. |
| 6,074,228 A | 6/2000 | Berg et al. |
| 6,085,006 A | 7/2000 | Gaio et al. |
| RE36,820 E | 8/2000 | McGinley et al. |
| 6,101,087 A | 8/2000 | Sutton et al. |
| 6,142,802 A | 11/2000 | Berg et al. |
| 6,142,828 A | 11/2000 | Pepe |
| 6,149,465 A | 11/2000 | Berg et al. |
| 6,178,096 B1 | 1/2001 | Flickinger et al. |
| 6,179,627 B1 | 1/2001 | Daly et al. |
| 6,190,054 B1 | 2/2001 | Tamaki et al. |
| 6,200,041 B1 | 3/2001 | Gaio et al. |
| 6,201,704 B1 | 3/2001 | Poplawski et al. |
| 6,203,333 B1 | 3/2001 | Medina et al. |
| 6,206,582 B1 | 3/2001 | Gilliland |
| 6,220,873 B1 | 4/2001 | Samela et al. |
| 6,220,878 B1 | 4/2001 | Poplawski et al. |
| 6,226,188 B1 | 5/2001 | Warren |
| 6,229,708 B1 | 5/2001 | Corbin, Jr. et al. |
| 6,231,145 B1 | 5/2001 | Liu |
| 6,241,534 B1 | 6/2001 | Neer et al. |
| 6,267,606 B1 | 7/2001 | Poplawski et al. |
| D446,501 S | 8/2001 | Donnell et al. |
| 6,276,943 B1 | 8/2001 | Boutros et al. |
| 6,304,436 B1 | 10/2001 | Branch et al. |
| 6,317,329 B1 | 11/2001 | Dowdy et al. |
| 6,335,869 B1 | 1/2002 | Branch et al. |
| 6,341,899 B1 | 1/2002 | Shirakawa et al. |
| 6,350,063 B1 | 2/2002 | Gilliland et al. |
| 6,358,082 B1 | 3/2002 | Letourneau |
| 6,364,540 B2 | 4/2002 | Shishikura et al. |
| 6,364,709 B1 | 4/2002 | Jones |
| 6,369,924 B1 | 4/2002 | Scharf et al. |
| 6,371,787 B1 * | 4/2002 | Branch et al. ............... 439/352 |
| 6,406,317 B1 | 6/2002 | Li et al. |
| 6,416,361 B1 | 7/2002 | Hwang |
| 6,422,763 B1 | 7/2002 | Halbach et al. |
| 6,430,053 B1 | 8/2002 | Peterson et al. |
| 6,431,901 B1 | 8/2002 | Yeh |
| 6,431,902 B1 | 8/2002 | Yeh |
| 6,434,015 B1 | 8/2002 | Hwang |
| 6,439,918 B1 | 8/2002 | Togami et al. |
| 6,485,322 B1 | 11/2002 | Branch et al. |
| 6,494,623 B1 | 12/2002 | Ahrens et al. |
| 6,517,382 B2 | 2/2003 | Flickinger et al. |
| 6,519,160 B1 | 2/2003 | Branch et al. |
| 6,524,134 B2 | 2/2003 | Flickinger et al. |
| 6,530,785 B1 | 3/2003 | Hwang |
| 6,533,603 B1 | 3/2003 | Togami |
| 6,556,445 B2 | 4/2003 | Medina |
| 2002/0093796 A1 | 7/2002 | Medina |
| 2002/0167793 A1 * | 11/2002 | Branch et al. ............... 361/686 |
| 2003/0007738 A1 | 1/2003 | Cairnes et al. |
| 2003/0020986 A1 * | 1/2003 | Pang et al. ................. 359/152 |

* cited by examiner

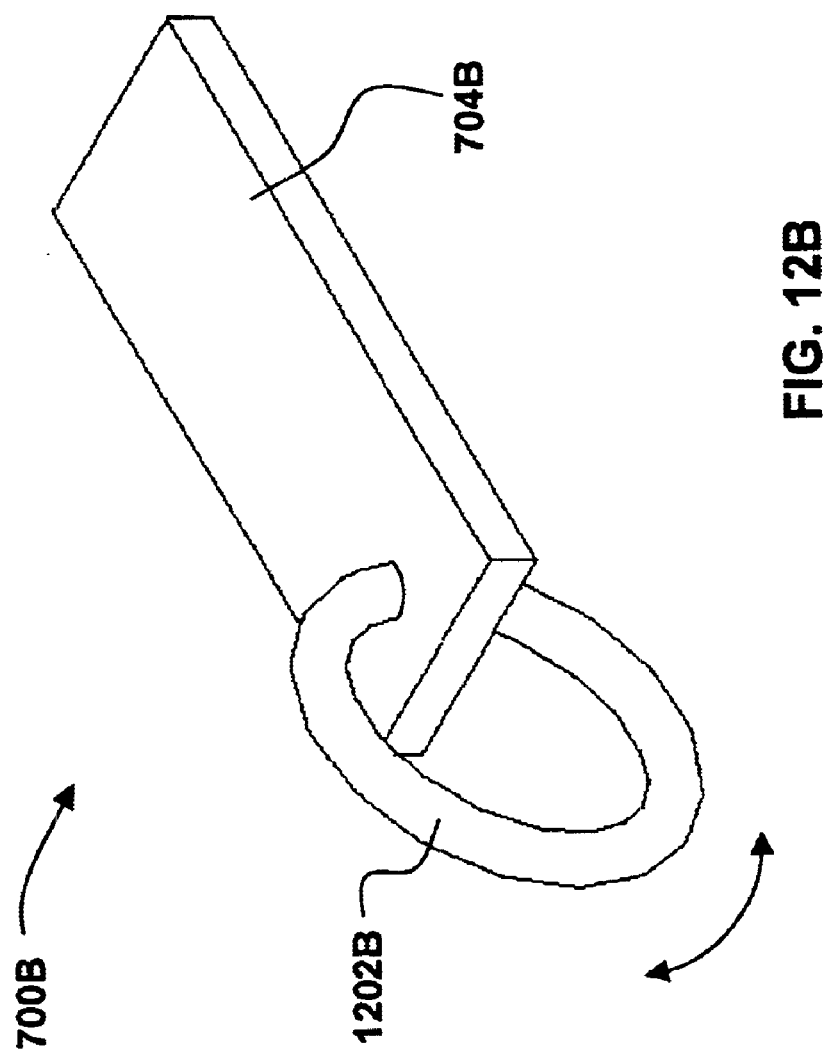

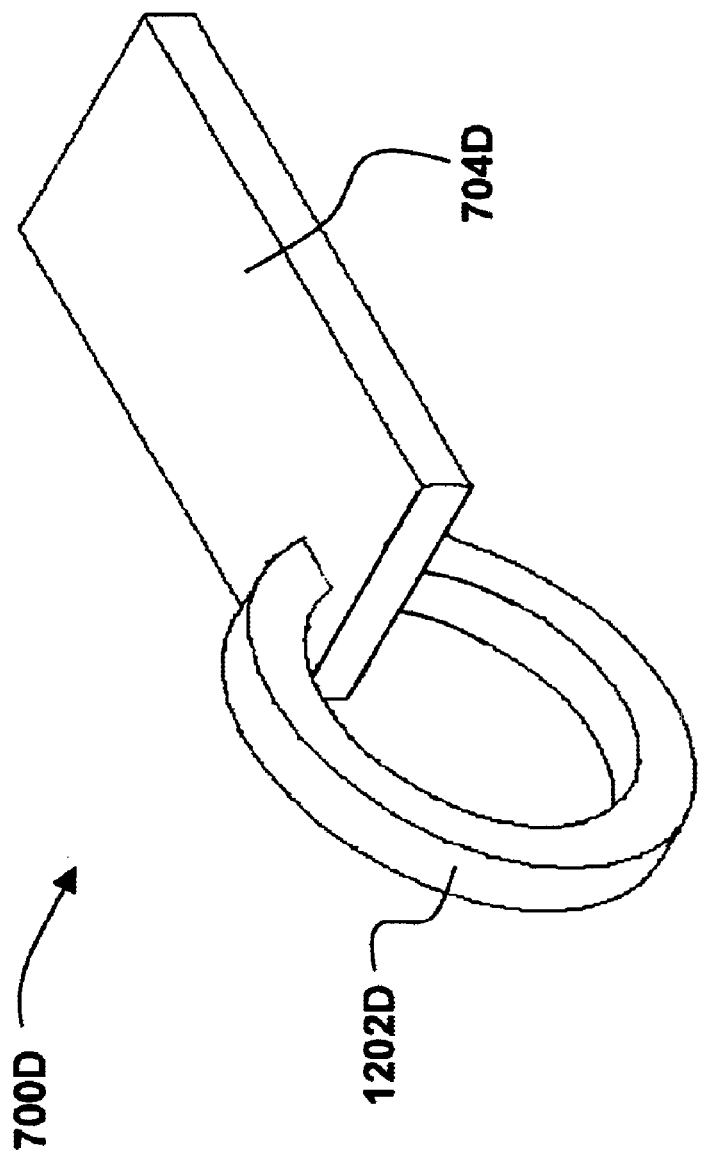

METHOD AND APPARATUS OF PULL-LEVER RELEASE FOR FIBER OPTIC MODULES

CROSS REFERENCE TO RELATED APPLICATIONS

This U.S. Non-Provisional patent application claims the benefit of U.S. Provisional Patent Application No. 60/265,182 entitled "QUICK RELEASE FIBER OPTIC MODULES", filed Jan. 29, 2001 by Ron Cheng Pang et al and U.S. Provisional Patent Application No. 60/265,374 entitled "QUICK RELEASE FIBER OPTIC MODULES", filed Jan. 30, 2001 by Ron Cheng Pang et al.

This application is also related to U.S. patent application Ser. No. 09/656,779, filed on Sep. 7, 2000 by Cheng Ping Wei et al; U.S. patent application Ser. No. 09/321,308, filed on May 27, 1999 by Wenbin Jiang et al and U.S. patent application Ser. No. 09/320,409, filed on May 26, 1999 by Wenbin Jiang et al, all of which are to be assigned to E2O Communications, Inc.

FIELD OF THE INVENTION

This invention relates generally to fiber optic modules. More particularly, the invention relates to release mechanisms for unplugging fiber optic modules.

BACKGROUND OF THE INVENTION

Fiber optic modules can transduce electrical data signals to transmit optical signals over optical fibers. Fiber optic modules can transduce optical signals received over optical fibers into electrical data signals.

The size or form factor of fiber optic modules is important. The smaller the form factor of a fiber optic module, the less space taken on a printed circuit board to which it couples. A smaller form factor allows a greater number of fiber optic modules to be coupled onto a printed circuit board to support additional communication channels. However, the smaller form factor makes it more difficult for a user to handle.

When a fiber optic module embedded in a system fails it is desirable to replace it, particularly when other communication channels are supported by other operating fiber optic modules. To replace a failed fiber optic module it needs to be pluggable into a module receptacle. While plugging in a new fiber optic module is usually easy, it is more difficult to remove the failed fiber optic module because of other components surrounding it. Additionally, a user should not attempt to pull on fiber optic cables in order to try and remove a failed fiber optic module or else the user might cause damage thereto.

A typical release method for a pluggable fiber optic module is to push in on the fiber optic module and then pull out on the fiber optic module to release it from a cage assembly or module receptacle. The pushing and then pulling puts extra strain on components and oftentimes requires more than one cycle of pushing and pulling.

BRIEF DESCRIPTIONS OF THE DRAWINGS

FIGS. 12A–12G illustrate various views of alternative embodiments-of pull ends for pull-lever actuators.

Like reference numbers and designations in the drawings indicate like elements providing similar functionality.

DETAILED DESCRIPTION OF THE PREFERRED EMBODIMENT

In the following detailed description of the invention, numerous specific details are set forth in order to provide a thorough understanding of the invention. However, the invention may be practiced without these specific details. In other instances well known methods, procedures, components, and circuits have not been described in detail so as not to unnecessarily obscure aspects of the invention.

In the following description, certain terminology is used to describe various features of the invention. For example, a "fiber-optic transceiver" is a fiber optic module having optical signal transmit and receive capability. The terms "disengage", "release", "unlatch", and "de-latch" may be used interchangeably when referring to the de-coupling of a fiber optic module from a cage assembly.

The invention, which makes it easier to remove fiber optic modules, includes a method, apparatus and system for fiber optic modules. One type of fiber optic module is a hot pluggable optical transceiver in a small form pluggable (SFP), LC type package. Another fiber optic module is a hot pluggable optical transceiver in a small form pluggable (SFP), MT-RJ type package. Other types of fiber optic modules may include embodiments of the invention. Fiber optic modules may also be referred to as optical data links, optical links, fiber optic data links, or optical transceivers which includes fixed or soldered fiber optic modules or pluggable, removable or replaceable fiber optic modules.

Figure 1:
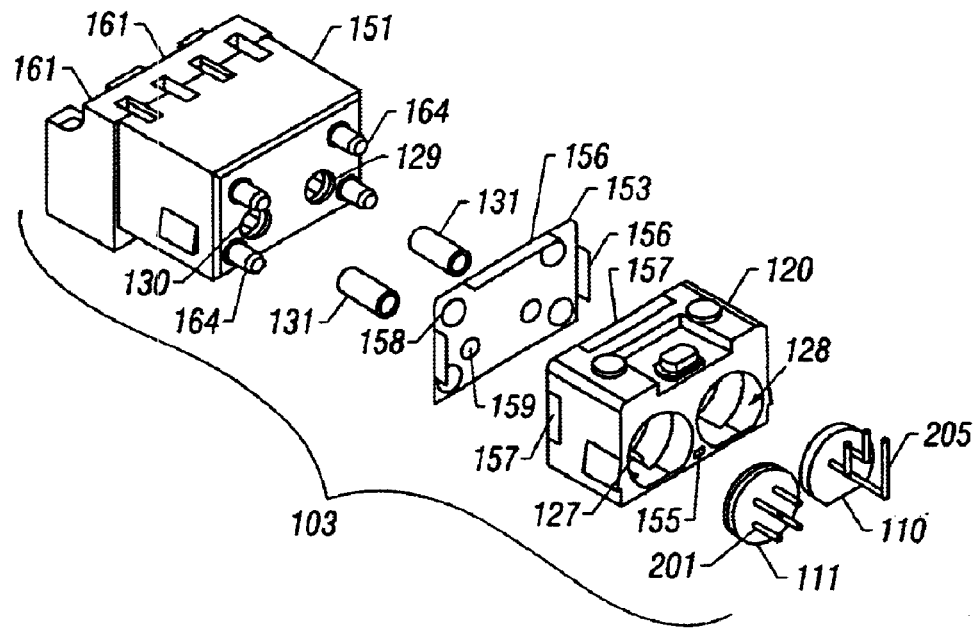
FIG. 1 is a simplified top-exploded view illustrating an optical element OE.

Referring now to FIG. 1, an exploded view of the optical element 103 of an embodiment of the invention is illustrated. The optical element 103 include a nose 151, a pair of fiber ferrule sleeves 131, an electromagnetic interference (EMI) shield plate 153, an optical block 120, a receiver 111, and a transmitter 110. The electromagnetic interference shield plate 153 provides shielding to keep electromagnetic interference from leaking into or out of the optical block 120 and the module. The optical block 120 aligns a light transmitter 110 and a light receiver 111 with two lenses in the optical block 120.

The light transmitters 110 or light receivers 111 are optoelectronic devices for communicating with optical fibers using light of various wavelengths or photons. An optoelectronic device is a device which can convert or transduce light or photons into an electrical signal or an electrical signal into light or photons. In the case of transmitters, the light transmitters 110 are packaged emitters that can convert electrical signals into light or photons. Examples of emitters are semiconductor lasers (i.e. a VCSEL) or an LED which may be packaged in TO (transistor outline) cans. In the case of receivers, the light receivers 111 are packaged photodetectors, that detect or receive light or photons and convert it into an electrical signal An example of a photodetector is a photo diode which may be packaged in a TO can. However other packages, housings or optoelectronic devices for receiving and transmitting light or photons may be used for the light transmitters 110 or light receivers 111.

The electromagnetic interference shield plate 153 has one or more projections 156 which engage one or more external notches 157 of the optical block 120 near its edges. The optical ports 159 of the electromagnetic interference shield plate 153 align with a pair of optical ports 129 and 130 of the nose 151. The electromagnetic interference shield plate 153 is electrically coupled to an outer housing 400 (shown on FIG. 5) via the projections 156 and shunts electromagnetic fields to the outer housing 400. The fiber ferules 131 can be inserted into the optical ports 129 and 130 upon assembly. The nose 151 further has one or more posts 164 over which one or more holes 158 in the electromagnetic interference shield plate 153 can slide in order to align the nose 151, the pair of fiber ferules 131, the electromagnetic interference shield plate 153 and the optical block 120 together.

The nose 151 has a pair of LC receptacles 161 for mechanically coupling and aligning a pair of fiber optic cables (not shown) into the fiber optic module 100. Each LC receptacle 161 is a fiber optic receptacle for one serial fiber optic channel. The LC receptacles 161 in the nose 151 are preferably located without spacing between each other. Neighboring channels are separated far enough apart that a fiber optic module 100 having multiple channels can comply with FDA and IEC Class-1 eye safety limits. This eases handling of the fiber optic module 100 is by avoiding the use of eye protection.

Due to the size of LC receptacles, TO-can size packages are usable which allows the output power level of each individual fiber optic channel to be separately monitored. Monitoring a fiber optic channel involves splitting the light beam so that a photodetector or photodiode receives a portion of the light beam. The electrical output of the photodiode is then measured to indicate the output power level of the fiber optic channel. The relaxed spacing of the individual fiber optic receptacles of the invention facilitate placing light beam splitters within the TO can of the light transmitter 110. The light beam splitter splits the beam such that a portion of the light beam lands on a photodiode within the TO can. The photodiode's output is measured to monitor the output power of the transmitter. Thus, with each channel being separately monitored for power output, each channel can be individually optimized. Those skilled in the art will also recognize that other fiber optic connectors such as, but not limited to, SC, MT-RJ, VF45, and MU connectors, may be used in lieu of the LC receptacles 161.

Figure 2:
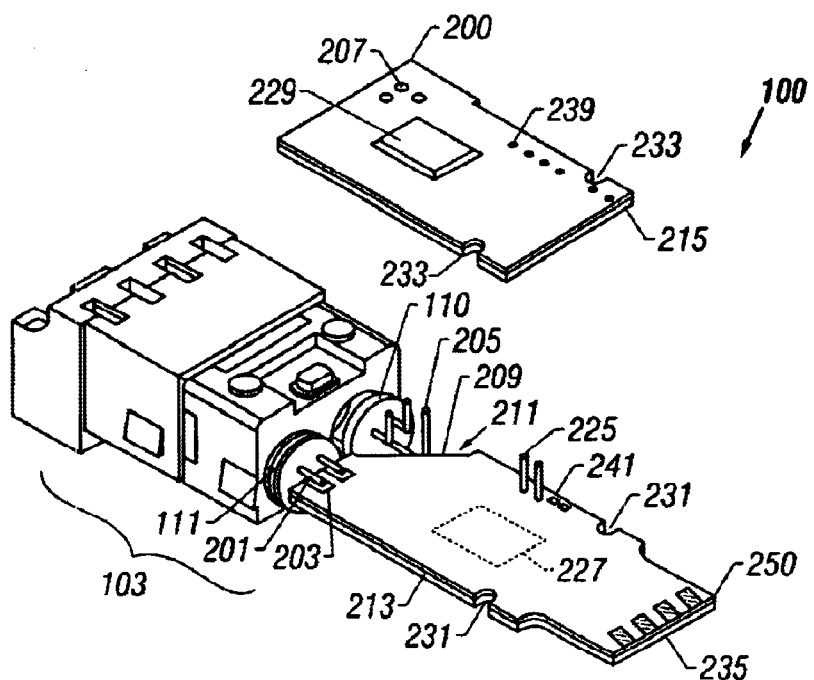
FIG. 2 is a partially assembled view of an optical element, receiver printed circuit board, and transmitter printed circuit board.

Referring now to FIG. 2, a partially assembled view of an optical element 103, a receiver printed circuit board 250, and a transmitter printed circuit board 200 for an embodiment of the invention is illustrated. Receiver printed circuit board 250 includes one or more receiver electrical components 227 (receiver integrated circuit (transimpedance amplifier and post amplifier), resistors, capacitors and other passive or active electrical components), a male electrical connector 235, and a receiver ground plane 213 (not shown). The transmitter printed circuit board 200 includes one or more transmitter electrical components 229 (transmitter integrated circuit (laser driver), resistors, capacitors and other passive or active electrical components) and a transmitter ground plane 215 (not shown). The receiver printed circuit board 250 and the transmitter printed circuit board 200 may be assembled by wave soldering.

At least one pin of the male electrical connector 235 couples to an external female electrical connector. The external female electrical connectors may be SFP (Small Form Pluggable) SMT (Surface Mount Technology) connectors. One or more pins of the male electrical connector 235 allow electrical signals, power, and ground to be coupled into or out of the fiber optic module 100.

Figure 3:
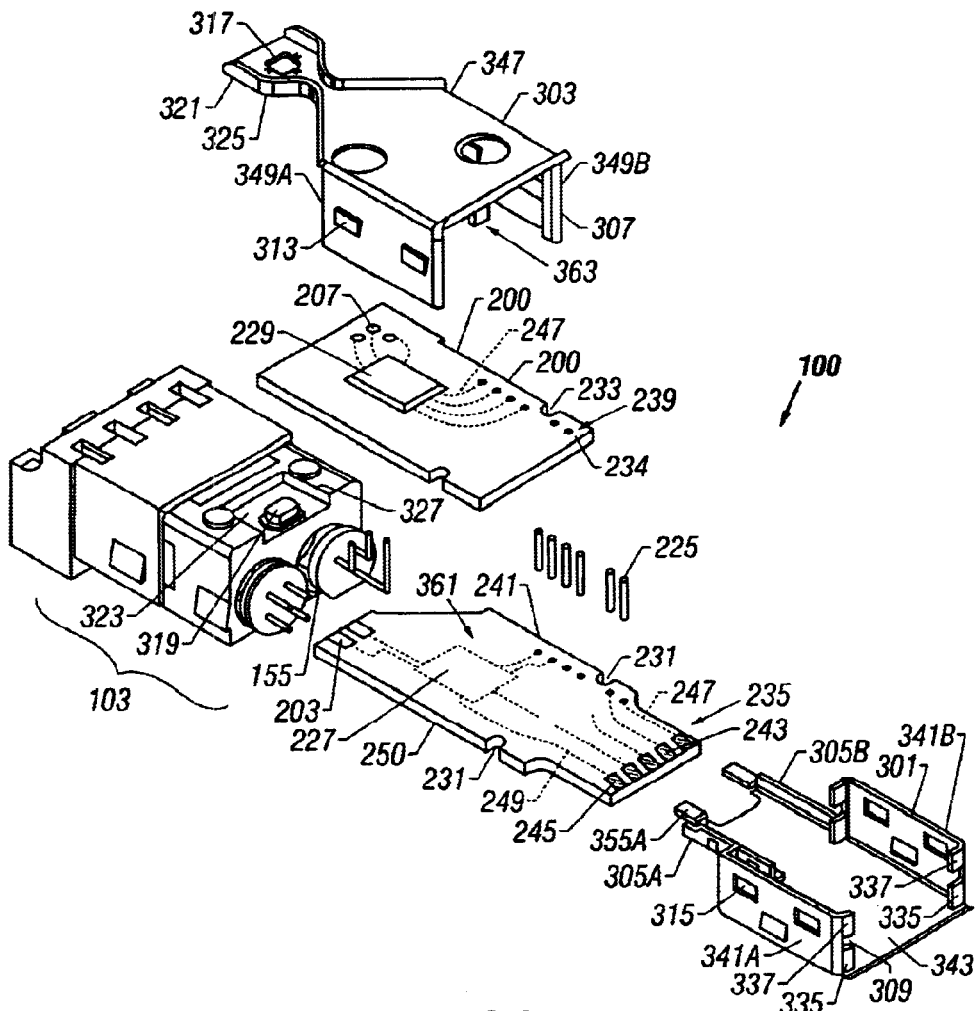
FIG. 3 is an exploded view of a printed circuit board cage subassembly and optical element.

Referring now to FIG. 3, an exploded view of the optical element 103, the receiver printed circuit board 250, the transmitter printed circuit board 200, a bottom frame 301, and a top frame 303 is illustrated. One or more transmitter pins 243 of the male electrical connector 235 which couple to the transmitter electrical components 229, the transmitter electrical components 229, the light transmitter 110, the interconnect leads 225 and a lens (not shown) of the optical block form one transmitting channel. The transmitter electrical components 229 control the light transmitter 110 and buffer the data signal received from a system for transmission over an optical fiber. One or more receiver pins 245 of the male electrical connector 235 which couple to the receiver electrical components 227, the receiver electrical components 227, the light receiver 111 and a lens (not shown) of the optical block form one receiving channel. The receiver electrical components 227 control the light receiver 111 and buffer the data signal received from an optical fiber. Other combinations of components can form other combinations of communications channels.

The optical element 103 includes the light receiver 111 with a plurality of straddle mount signal leads 201. The Straddle mount signal leads 201 are arranged in two horizontal rows to straddle a printed circuit board. The two rows of straddle mount signal leads 201 sandwich the receiver printed circuit board 250 so that the straddle mount signal leads 201 electrically couple the light receiver 111 to a plurality of receiver contacts 203 on both sides of the receiver printed circuit board 250. To improve the coupling between the straddle mount signal lead 201 and the receiver contacts 203, solder may be applied to the straddle mount signal leads 201 and the receiver contacts 203. The receiver contacts 203 are preferably a metal such as copper, silver, gold or other metal or alloy. The receiver contacts 203 may be on one or both the top and bottom surfaces of the receiver printed circuit board 250.

Optical element 103 has a light transmitter 110 with a plurality of formed (i.e. bent) signal leads 205. Each formed signal lead 205 is bent and turned up to couple to a header signal via 207, in the printed circuit board. The printed circuit board 250 has a cutout 209 that allows space for a horizontal portion of the formed signal lead 205. The cutout 209 may be at an angle cutting out a corner of receiver printed circuit board 250. In the alternative, the cutout 209 may be a square, semicircle, quarter circle or other shape. The vertical portion of each formed signal lead 205 is long enough to couple the light transmitter 110 to the transmitter printed circuit board 200.

The ends of formed signal leads 205 couple to a plurality of vias 207, through-holes, contacts or other coupling devices on the transmitter printed circuit board 200. To improve the coupling between a formed signal lead 205 and a via 207, solder may be applied to the formed signal lead 205 and the via 207. Since the printed circuit board assemblies and optical elements are mechanically coupled after the printed circuit boards have been wave soldered, the optical elements are not subject to the heat generated by wave soldering. While a 90 degree angle has been described, it is understood that other arrangements of the formed signal leads 205 may be employed to couple the light transmitter 110 to the transmitter printed circuit board 200.

When assembled into the fiber optic module, the receiver printed circuit board 250 and the transmitter printed circuit board 200 are vertically stacked and substantially parallel to each other. The top frame 303 and the bottom frame 301 hold the receiver printed circuit board 250 and the transmitter printed circuit board 200 in fixed vertical and horizontal alignment.

The fiber optic module further includes one or more interconnect leads 225 which electrically couple the transmitter electrical components 229 on the transmitter printed circuit board 200 to transmitter pins 243 of the electrical connector by means of signal traces in the receiver printed circuit board 250.

The receiver printed circuit board 250 includes a receiver ground plane 213 (shown in FIG. 2), and the transmitter printed circuit board 200 includes a transmitter ground plane 215 (shown in FIG. 2). Receiver ground plane 213 shunts electromagnetic fields radiating into it to ground via a pin in the male electrical connector 235. The transmitter ground plane 215 shunts electromagnetic fields radiating into ground through one or more of the interconnect leads 225, a transmitter trace 247 on the receiver printed circuit board 250, and a pin 243 in the male electrical connector 235.

The receiver printed circuit board 250 includes a pair of slots 231 (referred to as receiver slots 231) one in the left side edge and another in the right side edge of the printed circuit board as shown and illustrated in FIG. 2. The transmitter printed circuit board 200 includes a pair of slots 233 (referred to as transmitter slots 233) one in the left side edge and another in the right side edge of the printed circuit board as shown and illustrated in FIG. 2. The receiver slots 231 and the transmitter slots 233 facilitate alignment between the receiver printed circuit board 250 and the transmitter printed circuit board 200.

The bottom frame 301 includes a pair of sides 341A and 341B, a base 343, a pair of rails 305A and 305B, a plurality of lower support tabs 335 and a plurality of upper support tabs 337 extending from a pair of corners of each of the sides 341A and 341B as illustrated in FIG. 3. The base 343 of the bottom frame 301 is L shaped such that the rail 305B extends along the side and base of the bottom frame 301 while the rail 305B extends out of a center line (near the middle of the bottom frame) with a surface of the base there-between. The L shape leaves a cutout area from the base of the bottom frame which will be filled in by a bottom cover as described below. The rail 305A extending from the center line or middle of the bottom frame 301, includes a tip 355A that extends outward and is inserted into an opening 155 in the optical block 120.

The top frame 303 includes a Lop 347, a pair of top frame sides 349A and 349B, a pair of alignment rails 307, and a flange 321 as shown and illustrated in FIG. 3.

When assembled, the receiver printed circuit board 250 is inserted into a pair of slots 309 between the upper support tabs and the lower support tabs and rests on the lower support tabs 335 of the bottom frame 301. A pair of receiver slots 231 in edges of the receiver printed circuit board 250 are located near corners of the sides 341A and 341B of the receiver printed circuit board. The four lower support tabs 335 and the four upper support tabs 337 restrict vertical movement in the receiver printed circuit board 250 when its engaged thereto. One or more of the elements of the bottom frame 301 may be formed of a conductive material such as a metal or formed to include a conductive plating or surface. The conductive material of the bottom frame 301 shunts electromagnetic fields to ground via an electrical coupling to chassis ground. In this manner the bottom frame 301 can provide electromagnetic interference shielding for the fiber optic module.

When assembled, the transmitter printed circuit board 200 rests on the four upper support tabs 337 of the bottom frame 301 such that the pair of transmitter slots 233 in the transmitter printed circuit board 200 are aligned directly above the pair of receiver slots 231 in the receiver printed circuit board 250 at a position adjacent to and above the upper support tabs 337. The alignment of the slots 233 with the slots 231 in each of the respective printed circuit boards assures that the transmitter interconnect vias 239 align with the receiver interconnect vias 241 such that the one or more interconnect leads 225 can be coupled there-between. The one or more interconnect leads 225 couple the respective transmitter traces 247 in the transmitter printed circuit board 200 and the receiver printed circuit board 250 together. The interconnect leads 225 are soldered to the receiver printed circuit board 250 at the receiver interconnect vias 241 on one end and to the transmitter printed circuit board 200 at the transmitter interconnect vias 239 at an opposite end. Though the interconnect leads 225 have been described as providing electrical coupling between the receiver printed circuit board 250 and the transmitter printed circuit board 200, it is understood that other interconnect devices may be employed including ribbon cable, wires, male and female electrical connectors and the like.

The pair of top frame sides 349A and 349B of the top frame 303 engage with the bottom frame sides 341A and 341B of the bottom frame 301 respectively when they are assembled together. When assembled, external faces of the top frame sides 349 abut inside faces of bottom frame sides 341. Each of the top frame sides have a pair of locking tabs 313 which engage with a pair of lock tab apertures 315 in each of the bottom frame sides 341 to hold them together. The locking tabs 313 and the locking tab apertures 315 prevent the bottom frame 301 and the top frame 303 from moving vertically relative to each other. Each vertical edge of the top frame sides 349A and 349B mates with the upper tabs 337 and the lower tabs 335 to keep the top frame 303 from moving laterally relative to the bottom frame 301. The top frame 303 has the pair of alignment rails 307 on edges of the top frame sides 349A and 349B. The alignment rails 307 mate with the pair of transmitter slots 233 in the transmitter printed circuit board 200 and the pair of the receiver slots 231 in the receiver printed circuit board 250 to keep them in alignment so that the interconnect leads 225 are not sheared by movement in either and the electrical coupling is maintained. Top frame 303 has a tab 363, rib, post or other member on the underside of top 3417. When top frame 303 is assembled to the bottom frame 301 and transmitter board 200, the tab 363 prevents upward movement of transmitter printed circuit board 200. Additionally, the pair of alignment rails 307 abut a pair of lower support tabs 335 and a pair of upper support tabs 337 to maintain alignment and avoid movement as stress is placed on the receiver printed circuit board 250 when the fiber optic module is pulled away from a connector.

The top frame 303 includes the flange 321 which extends from the top 347 of the top frame 303 as shown and illustrated in FIG. 3. The flange 321 includes an opening 317 which slides over a top post 319 of the optical block 120 of the optical element 103. When the opening 317 of the flange 321 is mated with the top post 319, the top frame 303 is tightly coupled to the optical element 103 to avoid separation when the fiber optic module is inserted or removed from a connector. With the opening 317 engaged to the top post 319 so that the top frame is tightly coupled, the alignment rails 307 of the top frame 303 in conjunction with the receiver slots 231 and the transmitter slots 233, keep the receiver printed circuit board 250 and the transmitter printed circuit board 200 tightly coupled to the optical element 103 as well to avoid separation. The flange 321 includes a flange lip 325 that abuts a recess wall 327 of the optical block 120 to prevent lateral movement of the top frame 303 relative to the optical elements 103.

The top frame 303 includes a pair of top frame sides 349A and 349B and the top 347. These and other elements of the top frame may be formed of a conductive material such as a metal or formed to include a conductive plating or surface. The conductive material of the top frame 303 shunts electromagnetic fields to ground via an electrical coupling to chassis ground. In this manner, the top frame 303 provides electromagnetic interference shielding to the fiber optic module.

The assembled subassembly including the receiver printed circuit board 250, the transmitter printed circuit board 200, the interconnect leads 225, the bottom frame 301 and the top frame 303 can hereinafter be referred to as a printed circuit board assembly 411.

Figure 4A:
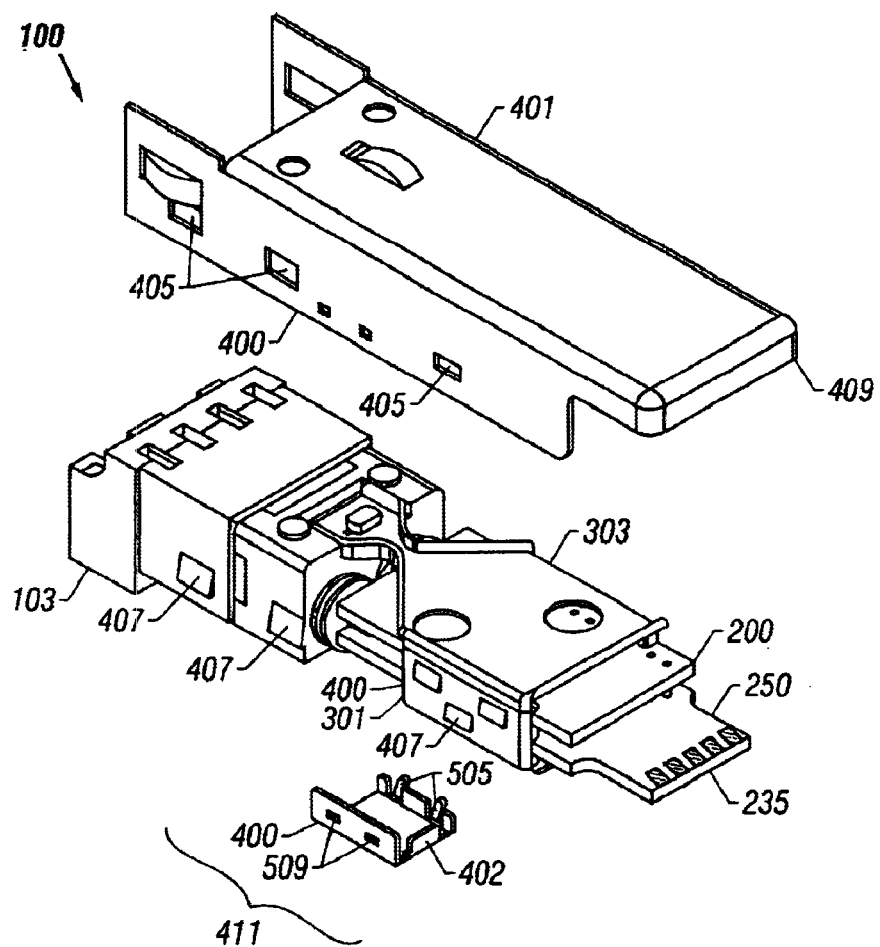
FIG. 4 is an exploded view for the rear of the hot pluggable fiber optic module.

Referring now to FIG. 4A, an exploded view of an outer housing 400 and the printed circuit board assembly 411 is illustrated. The outer housing 400 includes a top cover 401, a bottom cover 402 and the L shaped bottom frame 301. The top cover 401, the bottom cover 402 and the bottom frame 301 couple together and around the optical block 120 to encase, the receiver and transmitter printed circuit boards but for one end where the extension in the receiver printed circuit board forms the male connector 235. The top cover 401 includes a top portion and a pair of sides that fit over the printed circuit board assembly 411 and the optical element 103. The top cover 401 includes a plurality of locating tab openings 405 in each of its sides to engage with locating tabs 407 in sides of the optical block 120, in the nose of optical element 103, and in the bottom frame 301. When the locating tab openings 405 are engaged with the locating tabs 407, movement of the top cover 401 relative to the optical element 103 is prohibited. The top cover 401 includes a hood 409 which encloses an end of the transmitter printed circuit board 200 but leaves the connector 235 of the receiver printed circuit board 250 exposed to connect to a connector. The male electrical connector 235 extends from the top cover 401 to mechanically and electrically couple to an external female electrical connector.

The bottom cover 402 is of sufficient size to fill into the cutaway area in the L shaped bottom frame 301. The bottom cover 402 couples to the bottom frame 301 on one side and the top cover 401 on an opposite side.

Figure 4B:
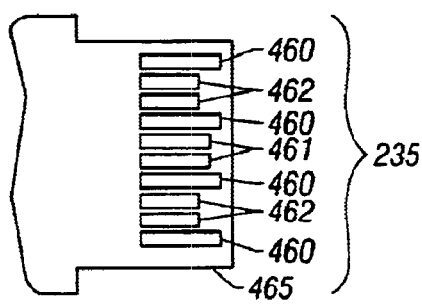
Figure 4C:
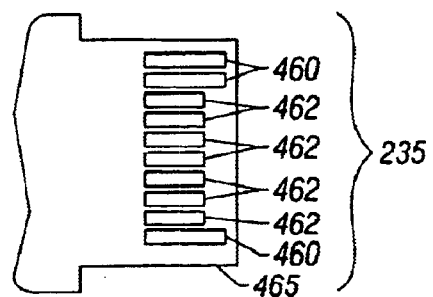

Referring now to FIGS. 4B and 4C, pins of the male electrical connector 235 are illustrated in detail to provide hot plugability. The male electrical connector 235 includes one or more ground or negative power pins 460, one or more positive power pins 461 and one or more signal pins 462 on top and/or bottom surfaces of the receiver printed circuit board 250. The pins 460, 461, and 462 are staggered from each other with reference to an edge 465 of the receiver printed circuit board 250 to facilitate the hot plugability. The ground pins 460 of the male electrical connector 235 are closer to the edge 465 than any other pin in the male electrical connector 235 in order for ground to be established first when the fiber optic module is inserted and for ground to be removed last when its removed. The positive power pins 461 are next closest to the edge 465 for power to be established secondly when the fiber optic module is inserted and for power to be removed next to last when its removed. The signal pins 462 are farther from the edge that the power pins 461 and ground pins 462 so that they are established after power and ground has been when inserted and they are disconnect first when the fiber optic module is removed.

During the mating of the male electrical connector 235 with an external female electrical connector, the ground pins electrically couple first to ground receptacles of the external female electrical connector in order to ground the fiber optic module 100. During the demating of the male electrical connector 235 and external female electrical connector, the ground pin electrically decouples from the ground last to maintain the grounding of the fiber optic module 100 until after power is removed from the fiber optic module 100. The ground pins 460 being closer to the edge 465 than the power pins 461 and the signal pins 462, prevents damage and disruption to the fiber optic module and the system during the physical insertion and removal of the fiber optic module into and out of the system. The capability to physically remove and insert the fiber optic module during operation without damage or disruption is referred to as hot plugability.

The outer housing 400, including the top cover 401 and the bottom cover 402 and the bottom frame 301, may be formed of a conductive material such as a metal or include a conductive plating or surface. With the outer housing 400 formed out of a conductive material, the outer housing 400 can shunt electromagnetic fields radiating into the outer housing 400 to ground via an electrical coupling to chassis ground. In this manner the outer housing 400 also can provide electromagnetic interference shielding to the fiber optic module.

Figure 5:
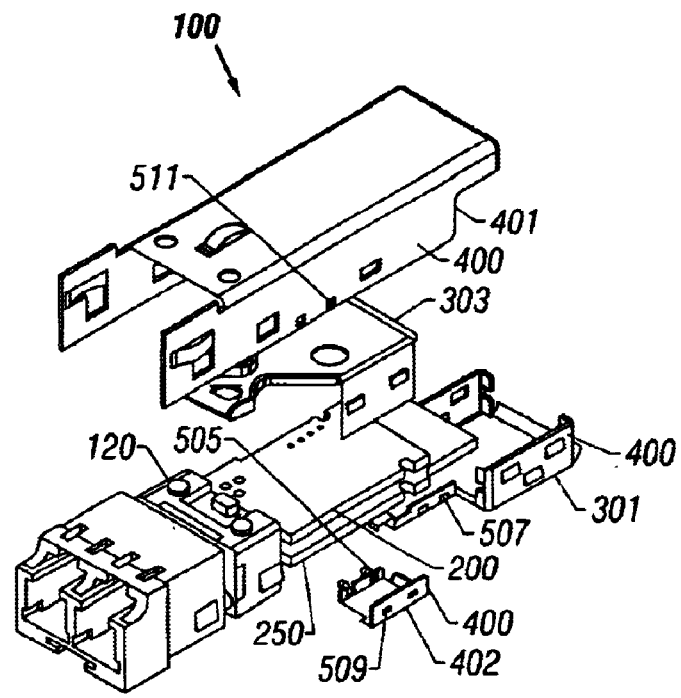
FIG. 5 is exploded view from the front of the fiber optic module.

Referring now to FIG. 5, an exploded view of the fiber optic module 100 from the front is illustrated. The bottom cover 402 of the outer housing 400 includes a pair of tabs 509 on one side and a pair of projections 505 on an opposite side. The projections 505 of the one side engage a pair of holes 507 in a side of the rail 305A of the bottom frame 301. The projections 505 in the opposite side of the bottom cover 402 engage the housing holes 511 in a side of the top cover 401. The inside surface of the side of the top cover 401 couples to the outer surface of the side of the bottom cover 402 when the tabs 509 are mated with the housing holes 511.

The bottom cover 402 can be readily disassembled and reassembled with the top cover 401 and the bottom frame 301 of the fiber optic module 100. By removing the bottom cover 402, a portion of the receiver printed circuit board is exposed to allow access to adjust adjustable electrical components (not shown) on the receiver printed circuit board 250. The adjustable electrical components electrically couple to the electrical components 227 on the receiver printed circuit board 250. The adjustable electrical components electrically couple to the electrical components 229 by way of a conductive path through one or more transmitter traces 361 on the receiver printed circuit board 250, the interconnect vias 225, and the transmitter traces 247 on the transmitter printed circuit board 200. The adjustable electrical components may include DIP switches, potentiometers, variable capacitors and other devices used to tune or adjust the performance of the fiber optic module 100.

Figure 6A:
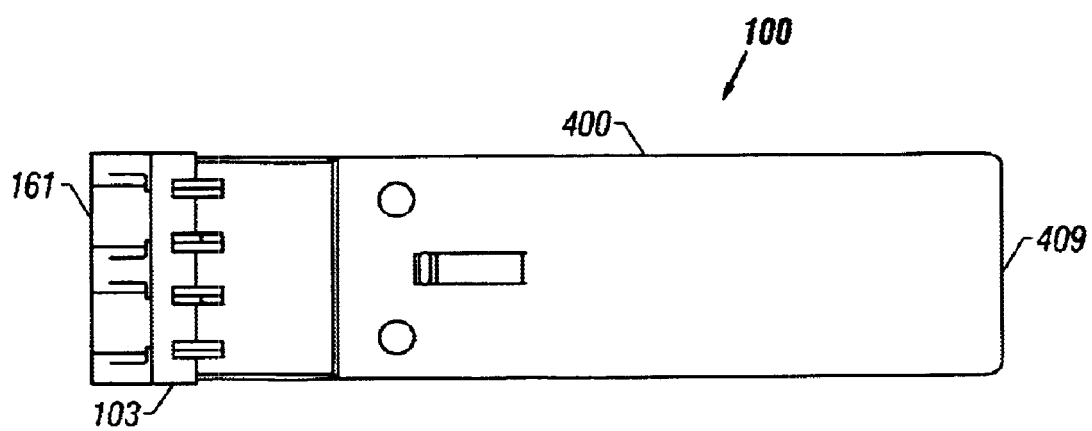
FIG. 6A is a top view of the assembled fiber optic module.
Figure 6B:
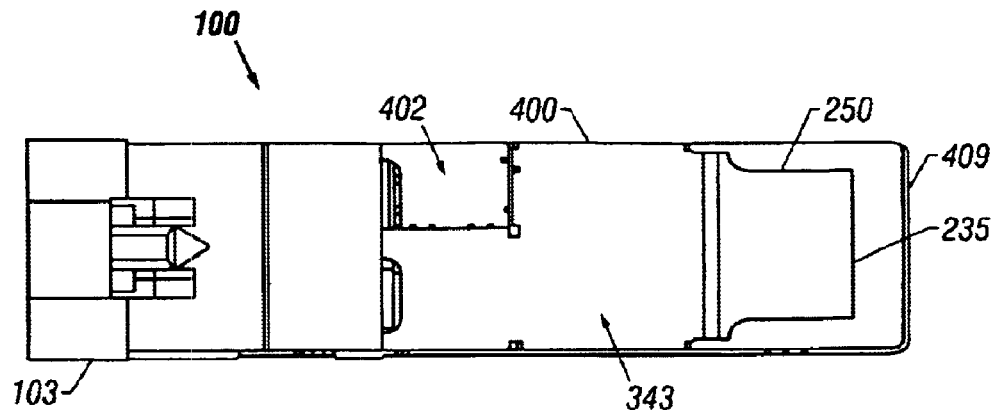
FIG. 6B is a bottom view of the assembled fiber optic module.
Figure 6C:
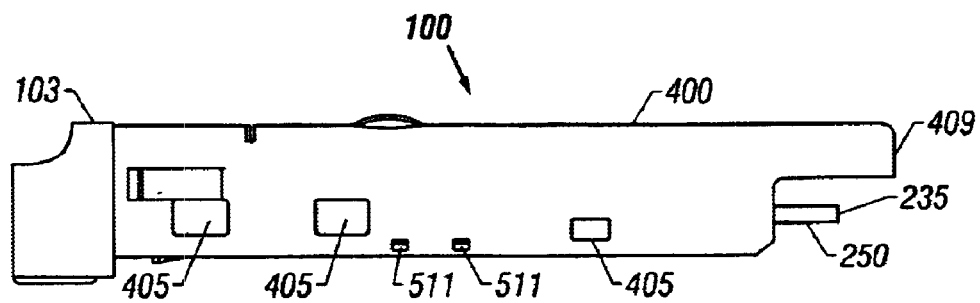
FIG. 6C is a right side view of the assembled fiber optic module.
Figure 6D:
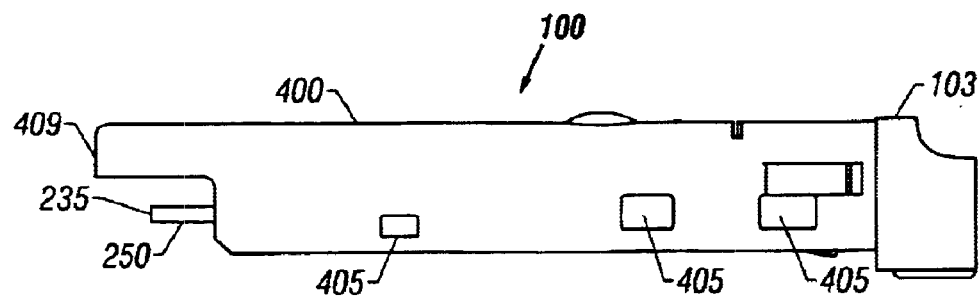
FIG. 6D is a left side view of the assembled fiber optic module.
Figure 6E:
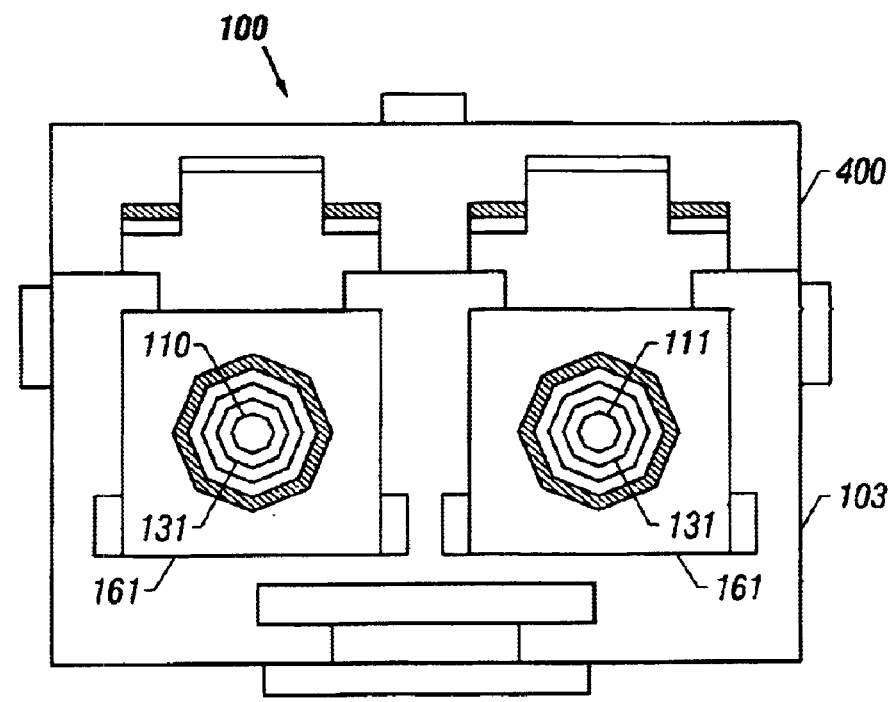
FIG. 6E is a front view of the assembled fiber optic module.
Figure 6F:
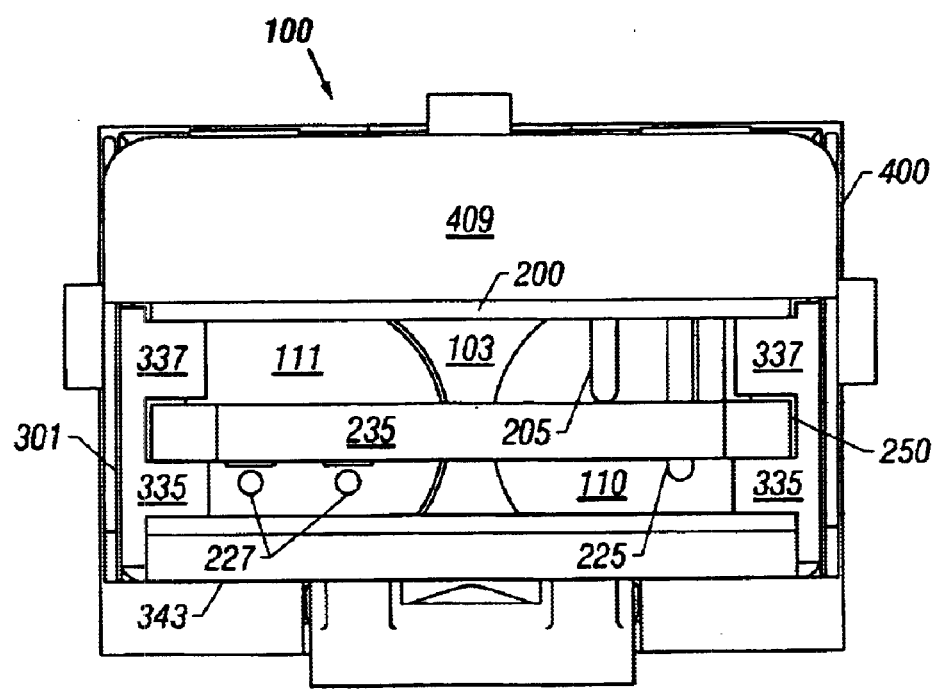
FIG. 6F is a rear view of the assembled fiber optic module.

The bottom cover 402 can also be formed of a conductive material such as a metal or include a conductive plating or surface which is coupled to chassis ground (via holes 507, housing holes 511 and tabs 505 and projections 509) in order to provide electromagnetic interference shielding for the fiber optic module FIG. 6A illustrates a top view of a fully assembled fiber optic module 100. FIG. 6B illustrates a bottom view of a fully assembled fiber optic module 100. FIG. 6C illustrates a right side view of a fully assembled fiber optic module. FIG. 6D illustrates a left side view of a fully assembled fiber optic module. FIG. 6C illustrates a front view of a fully assembled fiber optic module. FIG. 6D illustrates a rear view of a fully assembled fiber optic module. To assemble the fiber optic module 100 of the invention, the receiver printed circuit board 250 is first slid into the slots 309 of the bottom frame 301 between the upper support tabs 337 and the lower support tabs 335 until the receiver slots 231 are adjacent to, and just inside an end of the bottom frame 301. When receiver printed circuit board 250 is properly positioned in the bottom frame 301, receiver electrical components 227 are face down, the ground plane is face up and the male electrical connector 235 extends beyond the end of the bottom frame 301 so that its external thereto. Next, the one or more interconnect leads 225 are then press fit into the receiver interconnect vias 241. Solder is applied to the interconnect leads 225 at the receiver interconnect vias 241.

Then the transmitter interconnect vias 239 of the transmitter printed circuit board 200 are aligned with the one or more interconnect leads and press fit together so that the transmitter printed circuit board rests on top of the upper support tabs 337. With proper orientation, the ground plane is facing down toward the receiver printed circuit board while the transmitter electrical components 229 are on the face up side on the surface of the transmitter printed circuit board 200 and opposite the receiver printed circuit board 250. After press fitting them together, solder is applied to the interconnect leads 225 at the transmitter interconnect vias 239.

The top frame 303 is next in the assembly process. The alignment rails 307 of the top frame 303 are aligned with the transmitter slots 233 and the receiver slots 231. The alignment rails 107 are inserted into the transmitter slots 233 so that external surfaces of the sides 349A and 349B slide into the internal surfaces of the sides 341A and 341B respectively. The top frame 303 is coupled to the bottom frame such that the alignment rails 107 slide through the transmitter slots 233 and the receiver slots 231 until the locking tabs 313 engage with the lock tab apertures 315 to lock the top frame 303 in place relative to the bottom frame 301.

The optical elements 103 are prepared in parallel with forming the printed circuit board assembly 411. A die (not shown) is used to bend the signal leads of the light transmitter 110 through 90 degrees to form the formed signal leads 205 of the invention. The optical elements are then assembled and aligned together as a subassembly 103.

The printed circuit board subassembly 411 is then coupled together to the optical elements subassembly 103. The printed circuit board subassembly 411 is positioned with the optical elements so that the receiver contacts 203 of the receiver printed circuit board 250 align with the space between the horizontal rows of straddle mount signal leads 201. The flange 321 of the top frame 303 is flexed upward so that the opening 317 can mate with the post 319. The printed circuit board subassembly 411 and optical element subassembly 103 are brought together so that the receiver contacts 203 can electrically be couple to the straddle mount signal leads 201 and the tip 355A slides into the opening 155. The flange 321 is then released so that the opening 317 slides over the top post 319 to secure the printed circuit board subassembly 411 to the optical element subassembly 103.

Next the outer housing 400 is completed around the printed circuit board subassembly 411. The top cover 311 is aligned with the printed circuit board subassembly 411 so that the locating tab openings 405 can mate with the locating tabs 407. The top cover 401 is slid over the optical element subassembly 103 and the printed circuit board subassembly 411 so that the locating tabs 407 snap into the locating tab openings 405.

The bottom cover 402 is then couple to the bottom frame 301 and the top cover 401. The bottom cover is tilted so that the projections 505 engage the holes 507 in the side of the rail of the bottom frame 301. Then, the top cover 402 is pressed upward so that the tabs 509 engage with the housing holes 511 so that the bottom cover 402 is secured in place to complete the assembly of the fiber optic module 100.

For transmitting signals, the fiber optic module 100 electrically functions such that external electrical transmitter signals arriving at transmitter pins 243 in the male electrical connector 235 are coupled into the transmitter traces 247 routed on the receiver printed circuit board 250. The transmitter traces 247 couple the external electrical transmitter signal from the transmitter pins 243 to the receiver interconnect vias 241. The receiver interconnect vias 241 couple the transmitter signals to the one or more interconnect leads 225. The one or more interconnect leads 225 couple the electrical signals from the receiver interconnect vias 241 at one end into the transmitter interconnect vias 239 at an opposite end. The transmitter traces 247 on the transmitter printed circuit board 200 couple the electrical signals from the transmitter interconnect vias 239 into the transmitter electrical components 229 and/or the transmitter 110. The transmitter electrical components 229 process the electrical signals into electrical transmission pulses for coupling to the light transmitter 110. The light transmitter 110 transduces the electrical transmission pulses into light pulses for transmission over the fiber optic cables.

For receiving signals, the fiber optic module 100 electrically functions such that external light pulses arriving at the LC receptacles 161 are transduced into electrical pulses by the light receiver 111 for coupling into the receiver electrical components 227. The receiver electrical components 227 process the electrical pulses into electrical receiver signals which are coupled to the receiver traces 249 of the receiver printed circuit board 250. The receiver traces 249 couple the receiver signals to the receiver pins 245 in the male electrical connector 235 by which the electrical receiver signals are coupled to external devices. In one embodiment of the invention, one electrical component on one of the printed circuit boards controls both the light transmitter 110 and the light receiver 111.

In operation, the fiber optic module 100 may be housed in a rack or a cabinet designed to house an LC, GBIC package. When the fiber optic module 100 is inserted into the rack the male electrical connector 235 couples to a female electrical connector of the rack or cabinet. As the electrical connectors couple, one or more ground pins in the male electrical connector 235 electrically couples to one or more corresponding ground receptacles in the female electrical connector before any other pin electrically couples. One or more power pins in the male electrical connector 235 electrically couple to one or more corresponding power receptacles in the female electrical connector before any signal pins electrically couple. After the ground and power pins have coupled, one or more signal pins may then electrically couple to one or more corresponding signal receptacles. Either before or after the fiber optic module is inserted into the rack, fiber optical cables (not shown) are connected to the LC receptacles 161.

When it is desired to replace the fiber optic module 100 for some reason, the invention allows hot pluggable replacement. First the fiber connector is removed from the fiber optic module 100. Then the module is disconnected from any electrical connector into which it is coupled. As it is disconnected, the signal pins decouple first, the power pins second and the ground pins last. After which a new fiber optic module 100 can be inserted with the connecting sequence occurring as discussed above.

After the fiber optic module is disconnected, the optical element subassembly 103 or the printed circuit board subassembly 411 may be easily replaced. To replace the optical element 103, the flange 321 is flexed up to demate the opening 317 and the top post 319. The optical subassembly 103 is then pulled away from the printed circuit board assembly 411. As the optical subassembly 103 is pulled away from the printed circuit board assembly 411, the straddle mount signal leads 201 decouple from the receiver contacts 203. The formed signal leads 205 also decouple from the header signal vias 207. A replacement optical subassembly is then coupled to the printed circuit board assembly 411 as discussed above. After which the fiber optic module 100 (with the replacement optical element 103 coupled to the printed circuit board assembly 411) can be inserted with the connecting sequence occurring as discussed above.

To replace the printed circuit board assembly 411, the optical fiber optic module is removed as discussed above, except that the fiber optic cables need not be removed from the LC receptacles 161. The flange 321 is flexed up to demate the opening 317 and the top post 319. The optical element 103 is then pulled away from the printed circuit board assembly. As the printed circuit board assembly 411 is pulled away from the optical element 103, the straddle mount signal leads 201 decouple from the receiver contacts 203. The formed signal leads 205 also decouple from the header signal vias 207. A replacement printed circuit board assembly 411 is then coupled to the optical element 103 as discussed above. After which the fiber optic module 100 (with the optical element 103 coupled to the replacement printed circuit board assembly 411) can be inserted with the connecting sequence occurring as discussed above.

The previous detailed description describes the fiber optic module 100 as including one receiver and one transmitter. However, one of ordinary skill can see that the fiber optic module 100 may include two or more combinations of vertically stacked receivers, or transmitters, or receivers and transmitters. One embodiment of the invention includes four vertically stacked transmitters. Another embodiment includes four vertically stacked receivers. Yet another embodiment includes a combination of four vertically stacked transmitters and receivers.

Furthermore, as one of ordinary skill can see, the positions of the receiver printed circuit board 250 and the transmitter printed circuit board 200 may be reversed. In this embodiment of the invention, the transmitter printed circuit board 200 has the cutout 209 creating a distance 211 for the formed signal leads 205 of the light receiver 111. The formed signal leads 205 of the light receiver 111 couple to the header signal vias 207 on receiver printed circuit board 250. The straddle mount signal leads 201 of the light transmitter 110 couple to contacts on the transmitter printed circuit board 200. In this embodiment, the electrical components 227 and 229 are on opposite surfaces of the printed circuit boards 250 and 200 so that the ground planes 213 and 215 provide electromagnetic shielding to the electrical components 227 and 229.

In another embodiment of the invention, the transmitter printed circuit board 200 includes the male electrical connector 235. Receiver traces 249 of the transmitter printed circuit board 200 couple receiver pins 245 of the male electrical connector 235 to the interconnect vias 225. The interconnect vias 225 couple the receiver traces 249 of the transmitter printed circuit board 200 to receiver traces 249 of receiver printed circuit board 250 for coupling to receiver electrical components 227. The transmitter printed circuit board 200 also includes a portion that protrudes from the outer housing 400 and that includes the male electrical connector 235, thereby allowing the male electrical connector 235 to couple to an external female electrical connector.

Pull-lever Release for Pluggable Fiber Optic Modules

The invention provides a pull-lever release and withdrawal mechanism for removable or pluggable fiber optic modules, such as the fiber optic module 100 previously described. The pull-lever mechanism of the invention can be used to release and withdraw a removable or pluggable fiber optic module which is coupled into a module receptacle or cage assembly. The pull-lever release mechanism is a mechanical device for de-latching, unplugging, or disengaging a fiber optic module from a module receptacle or cage assembly. The invention is particularly applicable to de-latching, unplugging, or disengaging a small form pluggable (SFP) fiber optic module from an SFP cage assembly or module receptacle.

Referring now to FIGS. 7A–10E, views of subassemblies of the pull-lever release mechanism for pluggable fiber optic modules are illustrated. Referring momentarily to FIG. 1, the optical element 103 of the fiber optic module 100 can be modified to include the pull-lever release mechanism as an embodiment of the invention. To de-couple a pluggable fiber optic module from a cage or module receptacle, the pluggable fiber optic module is de-latched or unlatched and unplugged from any electrical sockets or connectors of the cage or module receptacle.

Referring now to FIGS. 7A–7F, views of a pull-lever actuator 700 for fiber optic modules is illustrated. The pull-lever actuator 700 is a mechanical device for withdrawing or pulling out a fiber optic module from a cage assembly or module receptacle. The pull-lever actuator 700 also provides EMI shielding to prevents EMI leakage from a front opening of a module's nose receptacle. The pull-lever actuator 700 also provides a grounding link between EMI Shield and a cage assembly through EMI grounding tabs.

The pull-lever actuator 700 includes a pull grip 702, a de-latching arm 704 having a keyhole 705, and an electromagnetic interference (EMI) shield 706 with one or more grounding tabs including a top side, a left side, a right side, and a bottom side grounding tabs 708T, 708L, 708R, 708B respectively. The top side grounding tab 708T, the left side grounding tab 708L, the right side grounding tab 708R, and the bottom side grounding tab 708B are generally referred to herein as grounding tab 708 or grounding tabs 708. The grounding tabs 708 may face forward, backward or a combination thereof. In the preferred embodiment, the top side grounding tab 708T, the left side grounding tab 708L, the right side grounding tab 708R face backward while the bottom side grounding tab 708B faces forward. In this case, the bottom side grounding tab 708B may be a cutout subsection of the de-latching arm 704.

The pull grip 702 is the pulling handle of the pull actuator 700 and fiber optic module. The pull grip 702 includes dimples 710 to prevent slippage and thereby improve gripping ability during handling.

The de-latching action of the pull-lever actuator 700 is achieved by pulling down on the Pull Grip 702 to disengage a hook 802 (see FIGS. 8B and 8E) of the fiber optic module from a latch (not shown) of the cage assembly. The de-latching arm 704 is the disengaging lever of the pull-lever actuator 700 and fiber optic module. The lever of the de-latching arm 704 is activated when a downward pulling action is applied from the pull grip 702. When the fiber optic module is plugged in, it has a hook which engages a latch of the cage or module receptacle. The keyhole 705 in the mid span of the de-latching arm 704 accommodates the hook of the fiber optic module by fitting over it when its engaged with the cage assembly or module receptacle. When the pull grip 702 is pushed downward, the de-latching arm 704 levers between the fiber optic module and the cage or module receptacle and holds the cage assembly's latch 1102 down to free the module's hook.

The EMI shield 706 is a vertical component of the pull-lever actuator 700 that rest between a Nose Receptacle 800 and an Optical Port 900 (as shown in FIGS. 8A–10E). As the name implies, the EMI shield 706 has a shielding ability to cut off EMI emitting from the front of the nose receptacle of the fiber optic module. The EMI shield 706 includes one to four grounding tabs 708 that provide additional guarding of EMI emission around the EMI shield. The grounding tabs 708 also provide grounding links or contacts between the EMI Shield 706 and the cage assembly or module receptacle. In typical cases, the cage assembly or module receptacle is grounded.

Figure 7A:
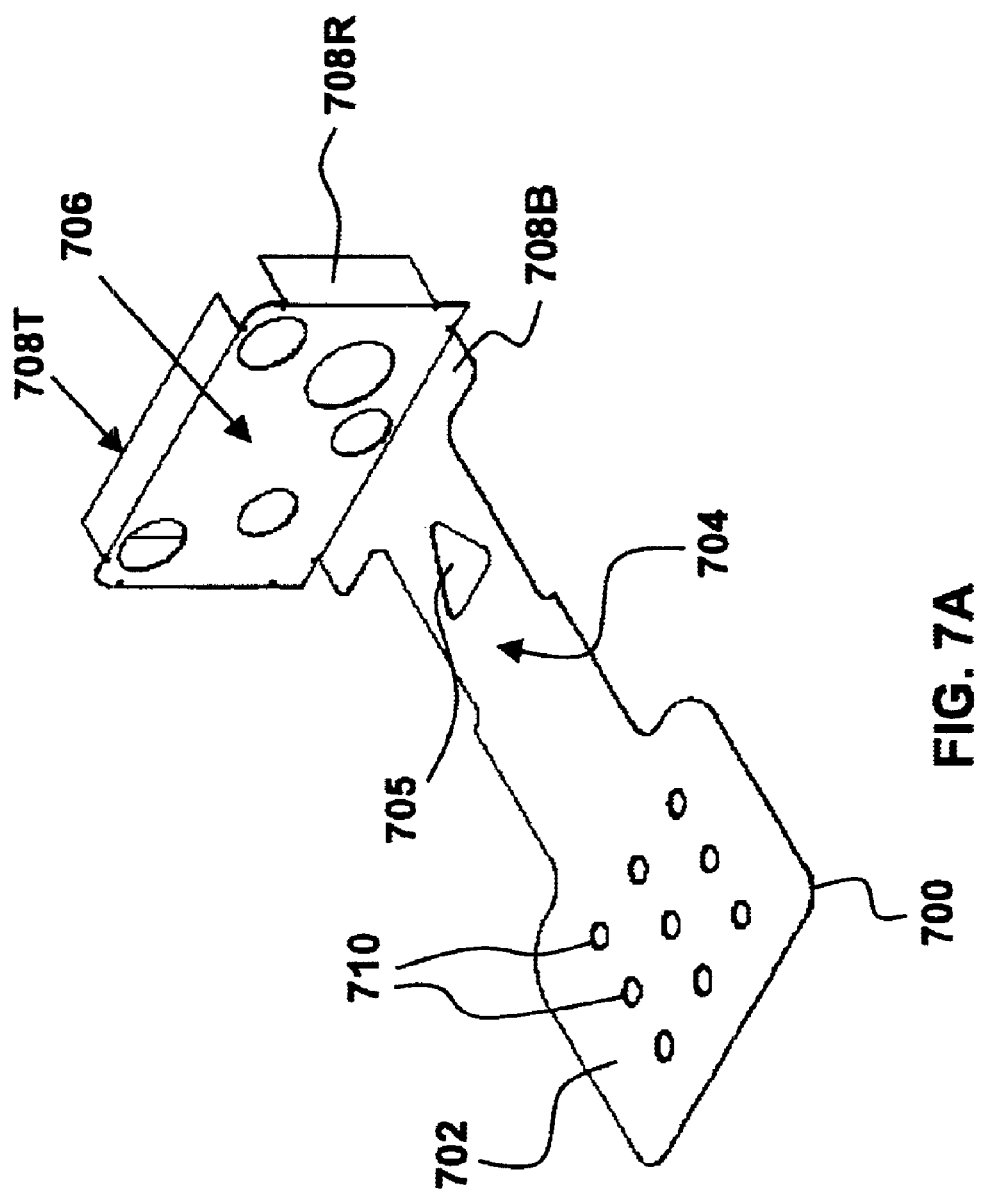
FIGS. 7A–7F are views of a pull-lever actuator for fiber optic modules.
Figure 7B:
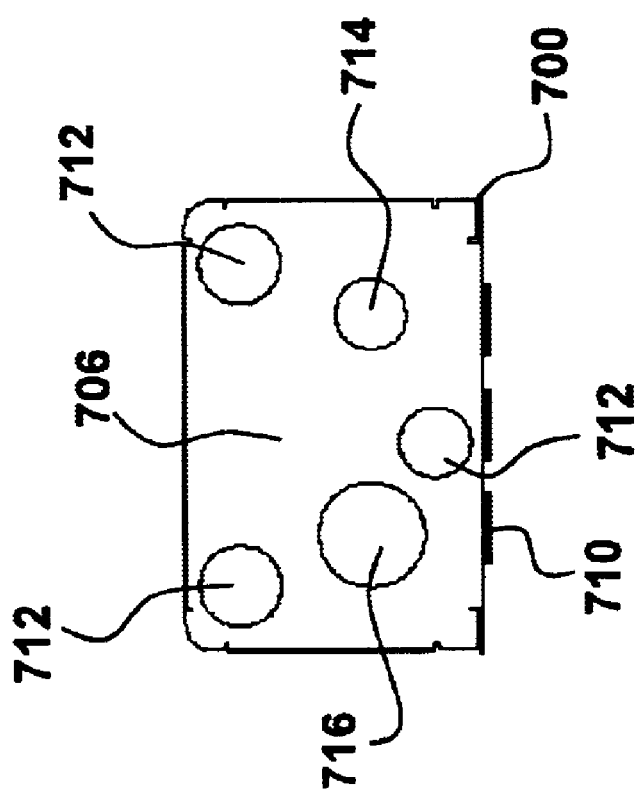
Figure 7C:
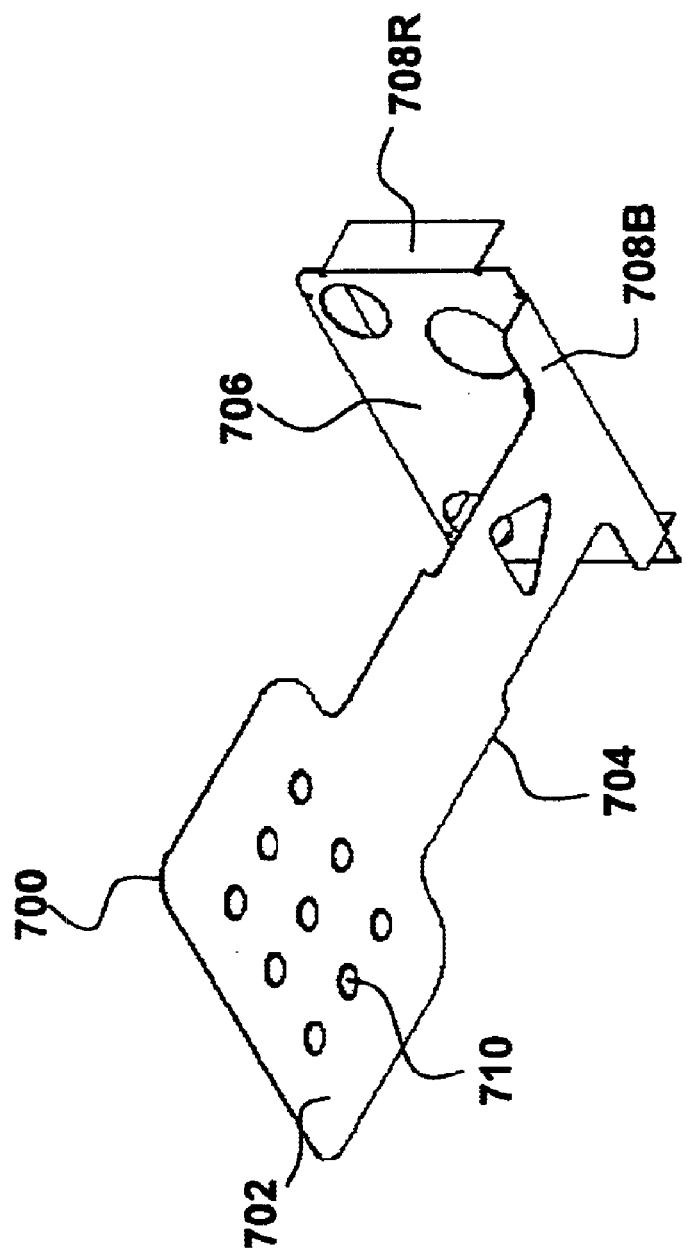
Figure 7D:
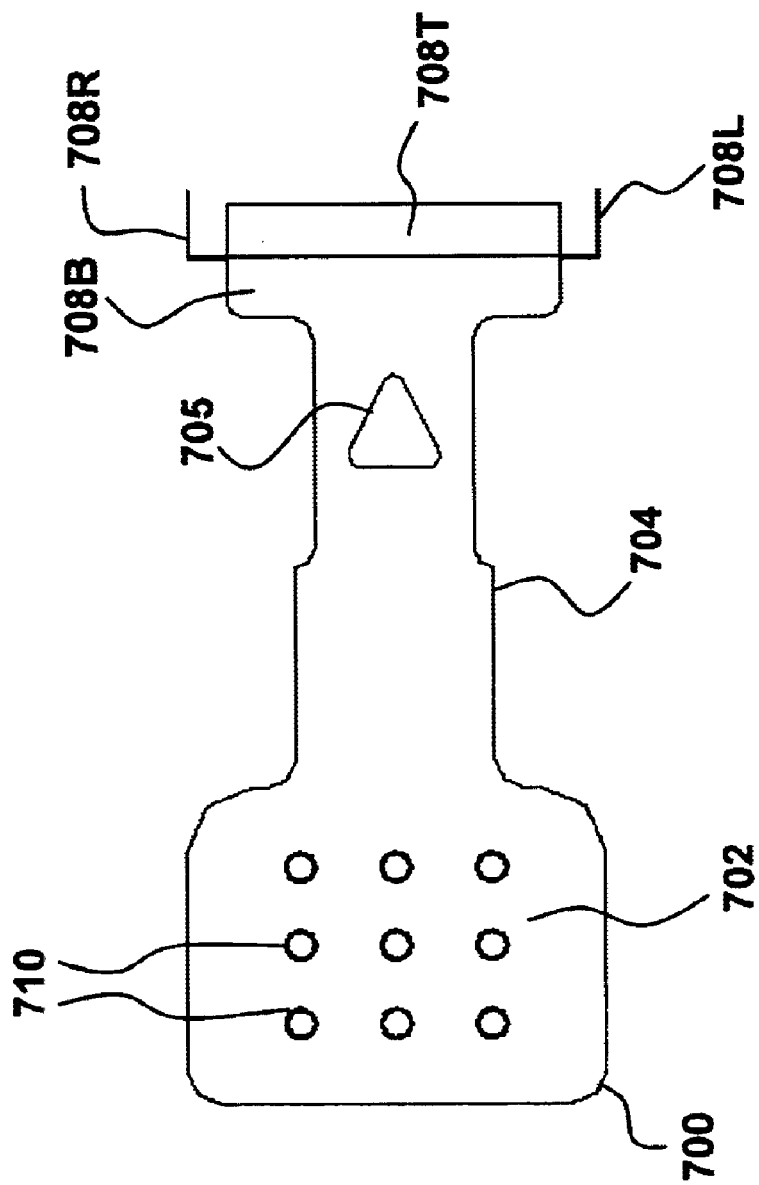
Figure 7E:
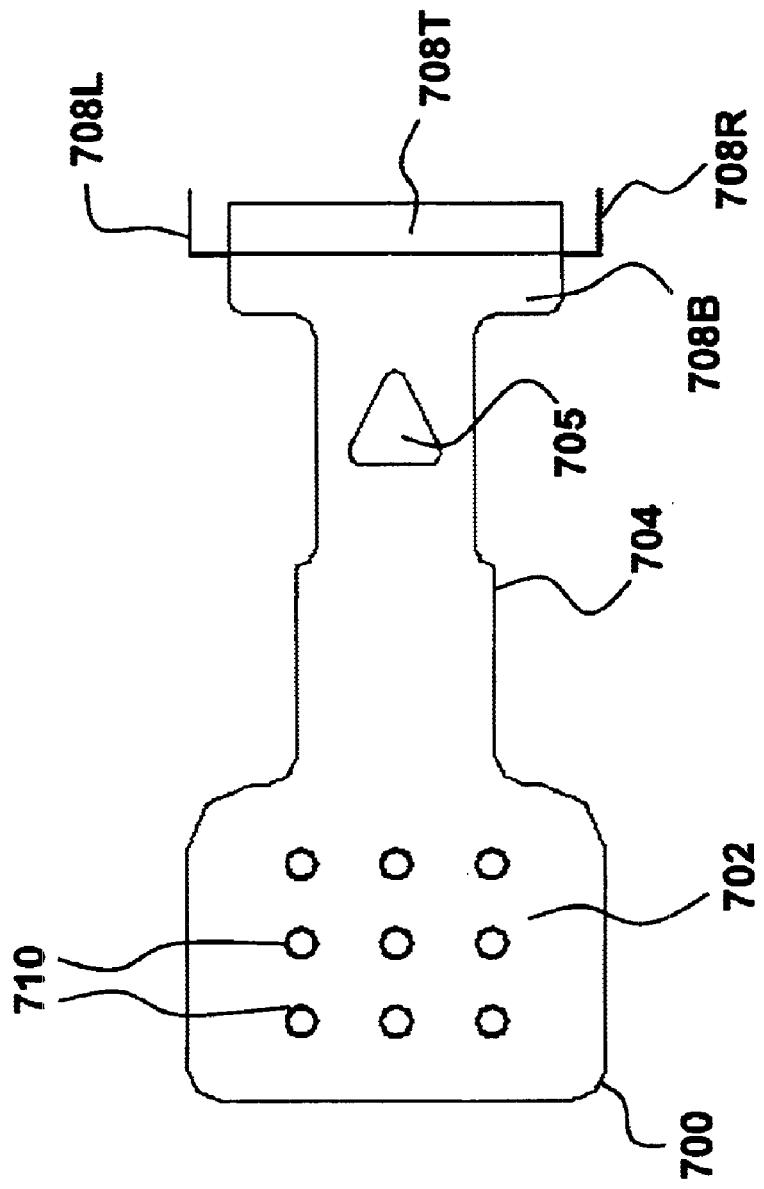
Figure 7F:
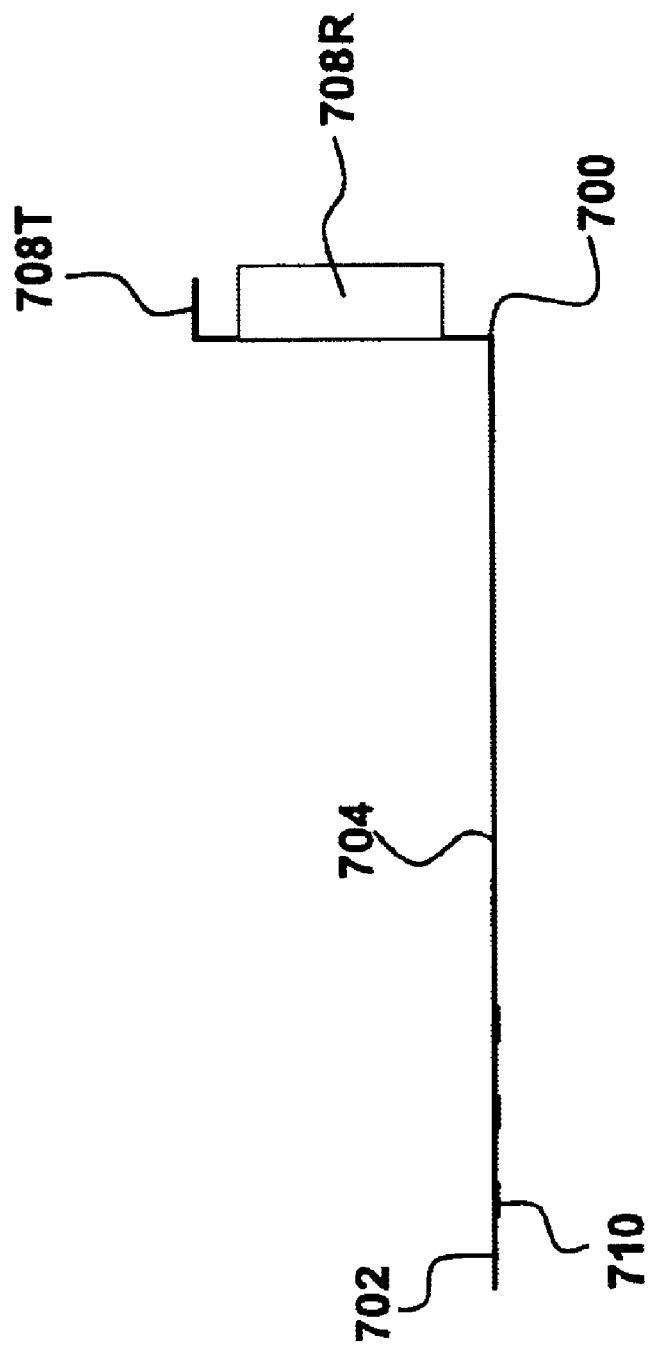
Figure 8A:
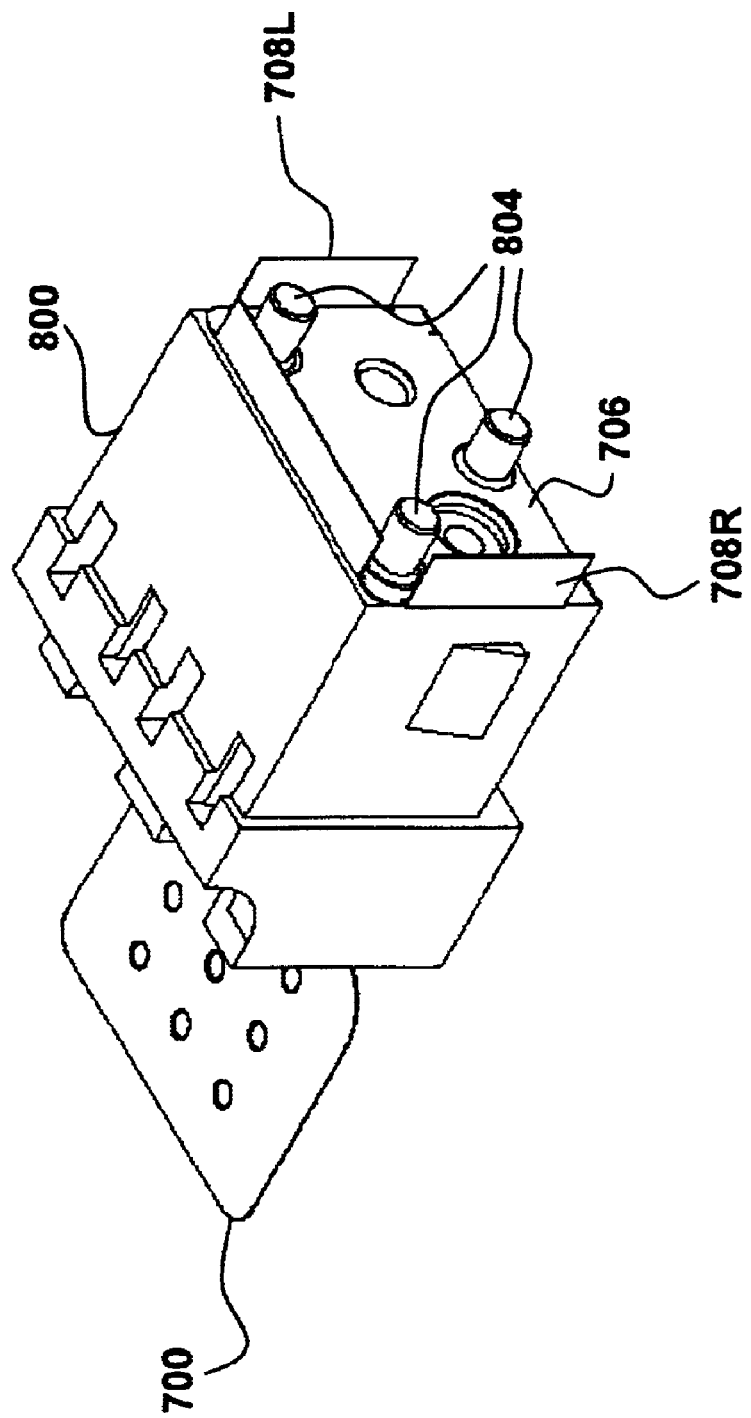
FIGS. 8A–8E are views of a subassembly of the pull-lever actuator of FIGS. 7A–7F coupled to a nose receptacle of fiber optic modules.
Figure 8B:
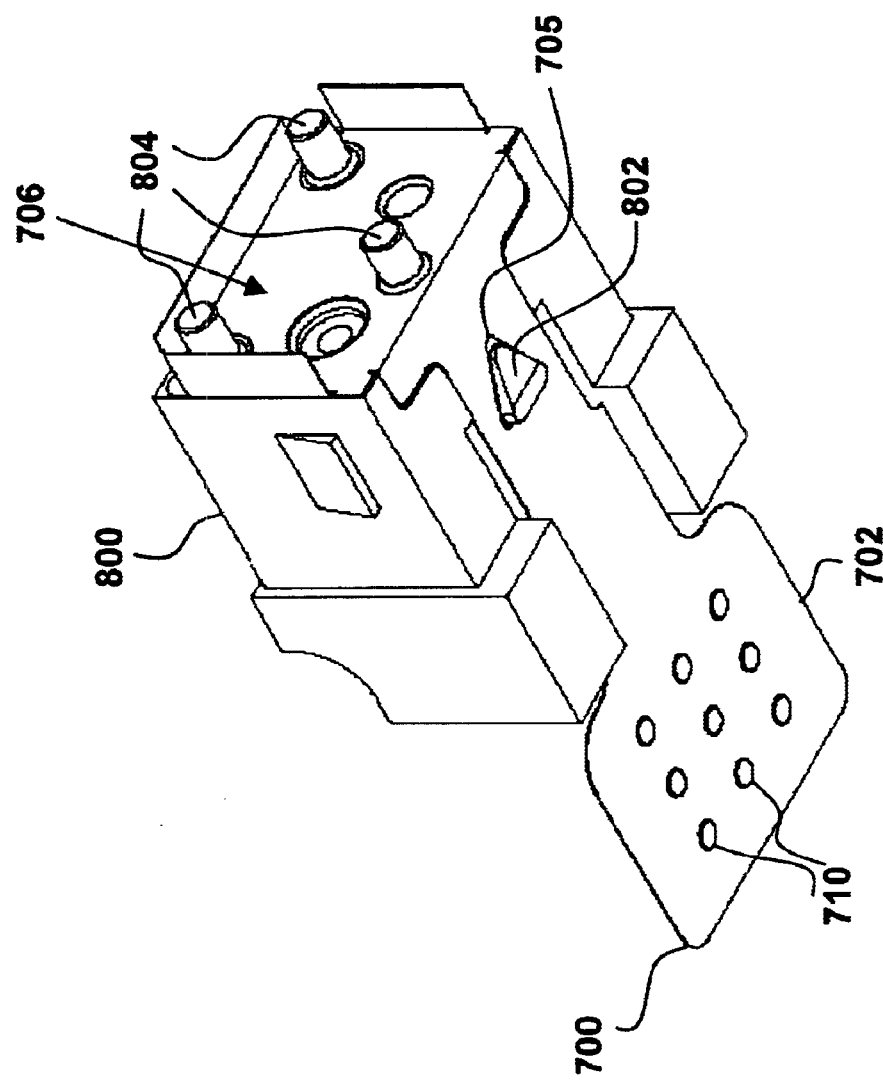
Figure 8C:
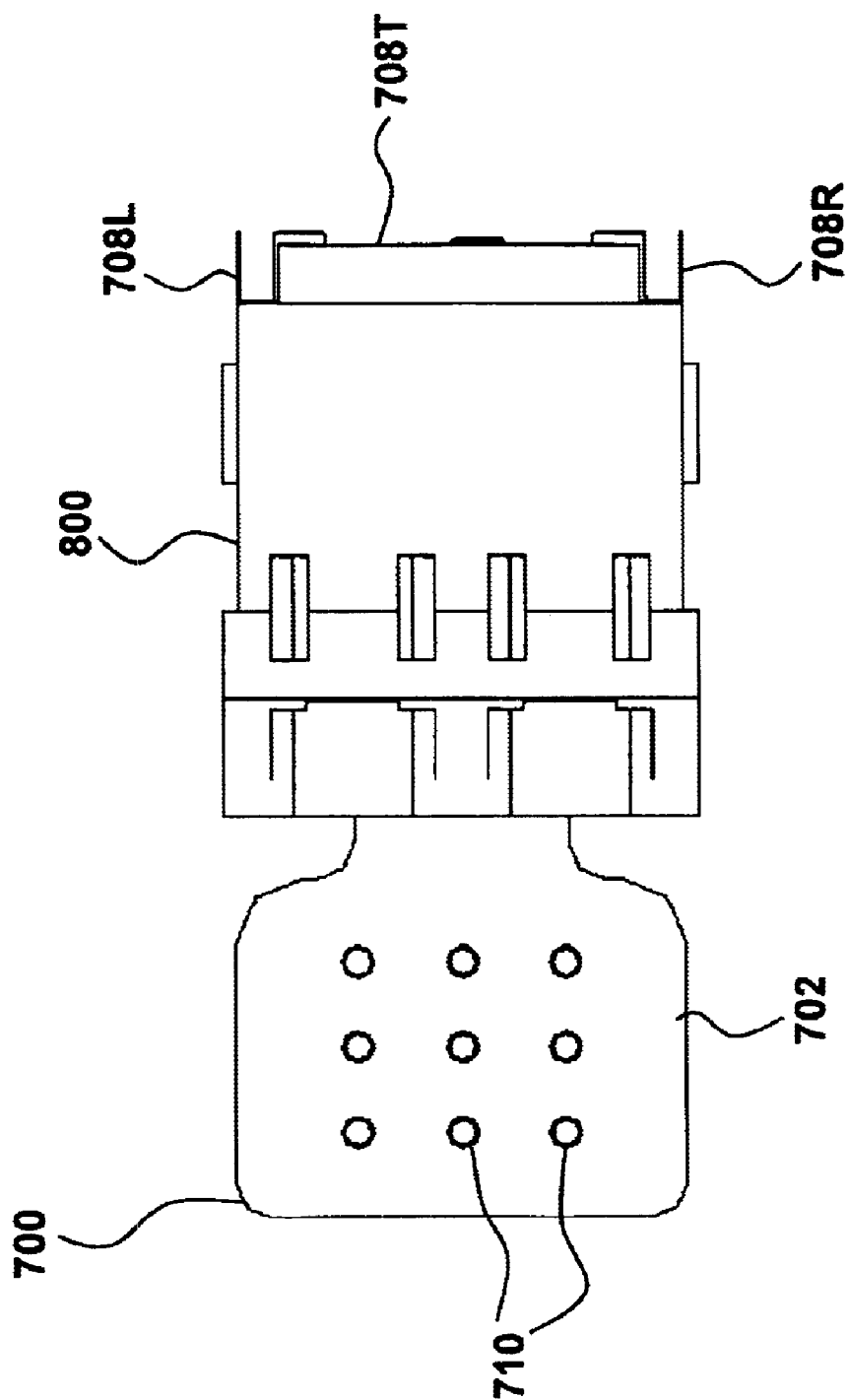
Figure 8D:
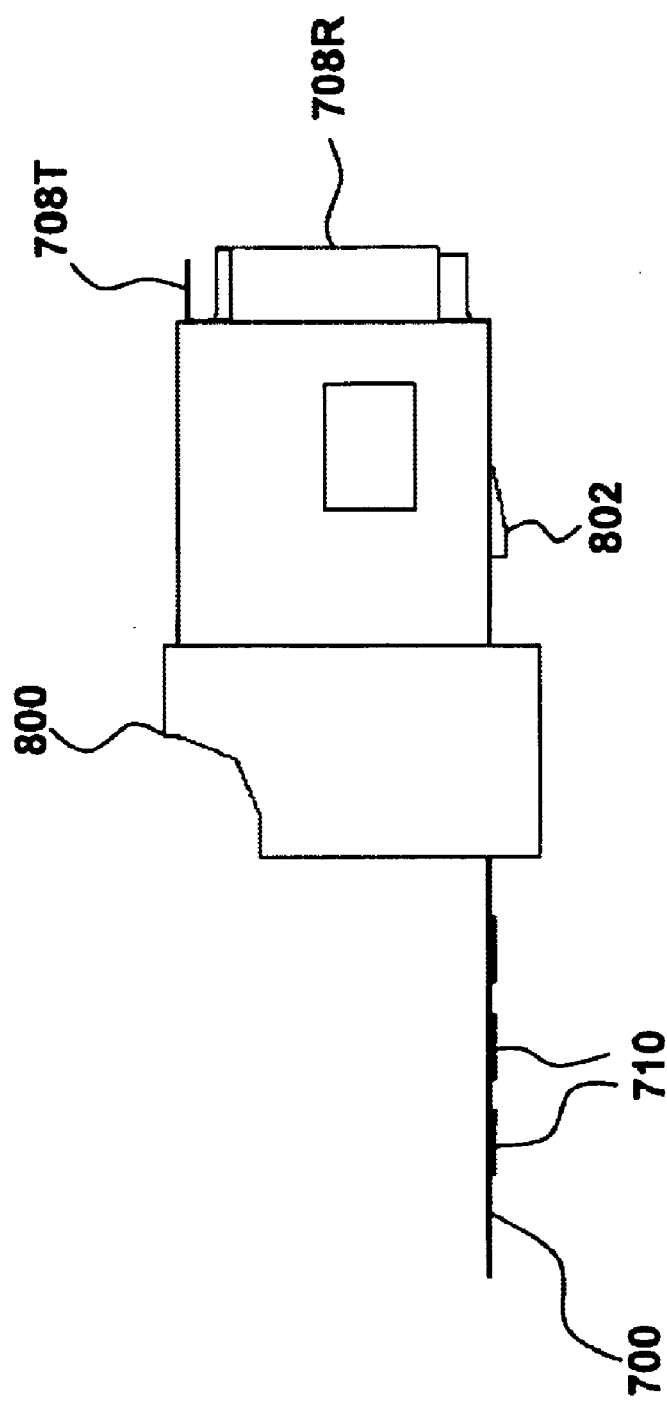
Figure 8E:
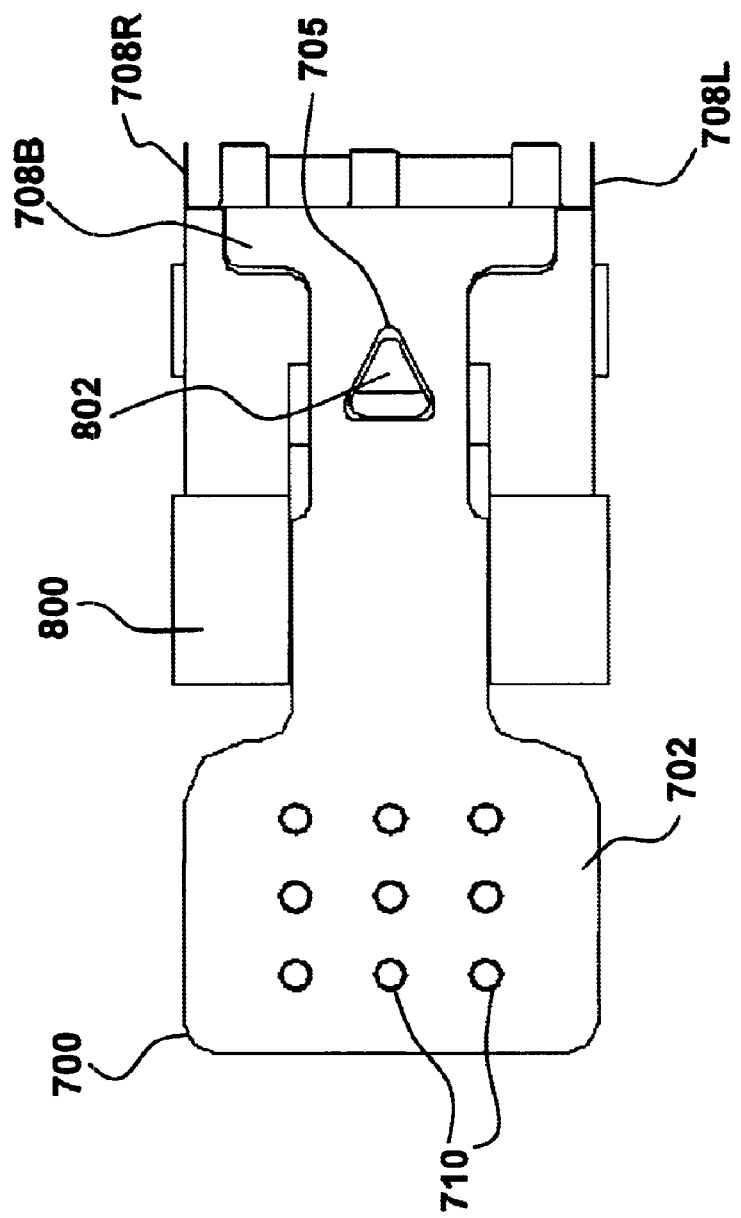
Figure 9A:
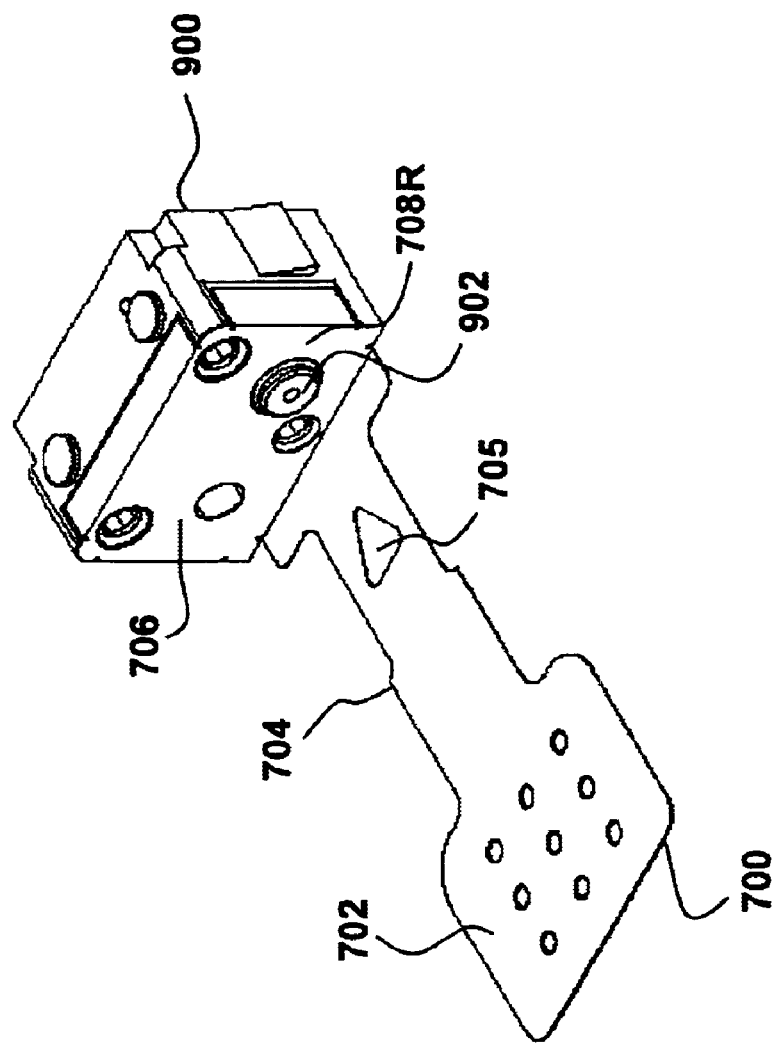
FIGS. 9A–9E are views of a subassembly of the pull-lever actuator of FIGS. 7A–7F coupled to an optical port of fiber optic modules.
Figure 9B:
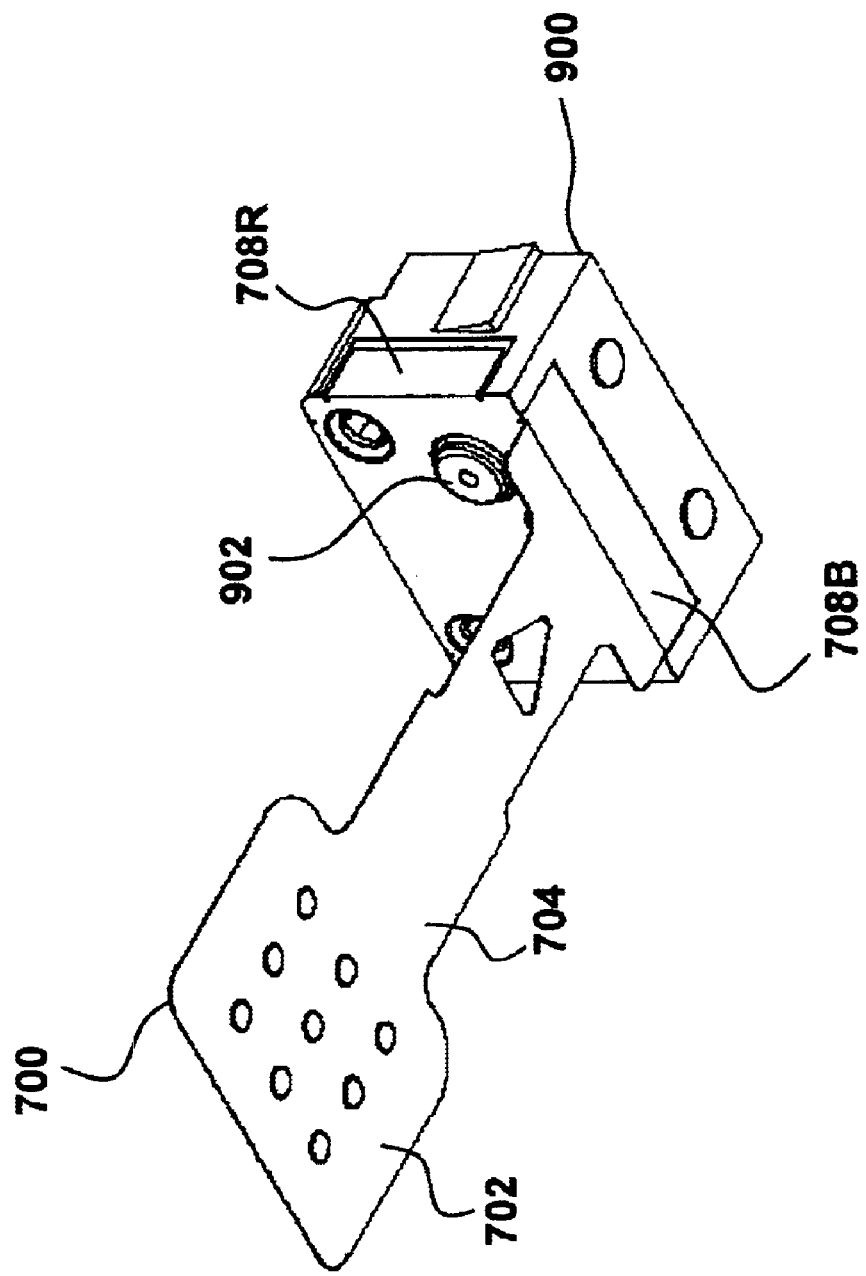
Figure 9C:
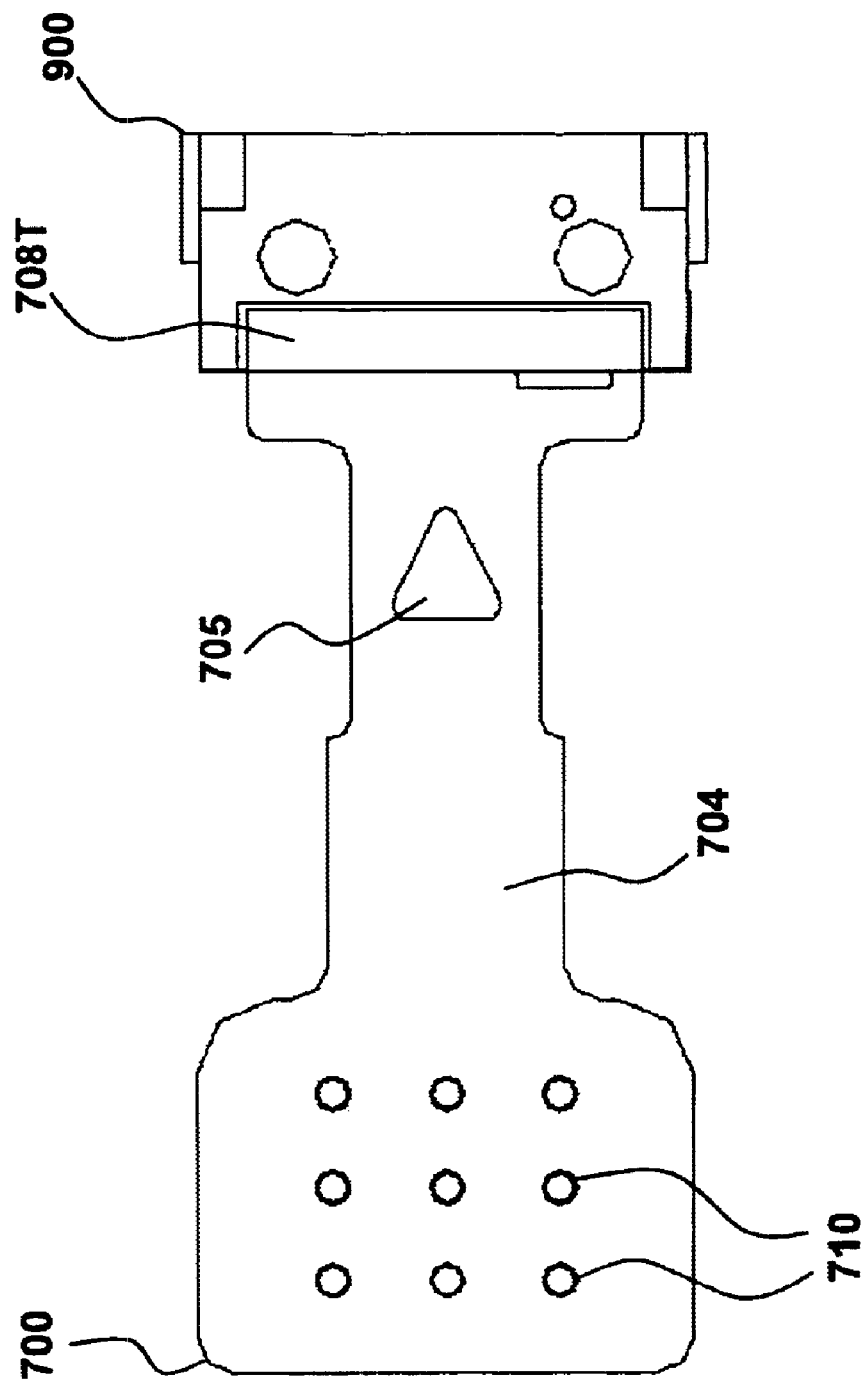
Figure 9D:
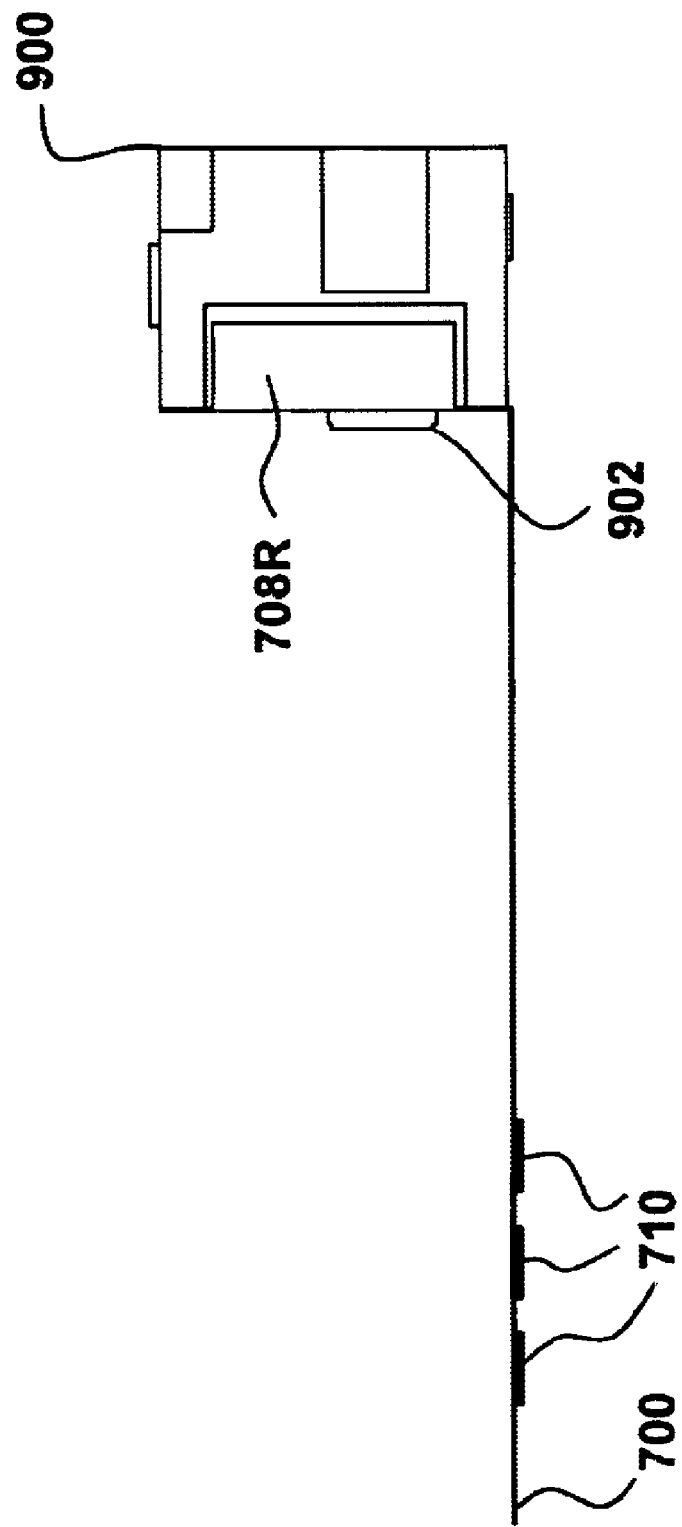
Figure 9E:
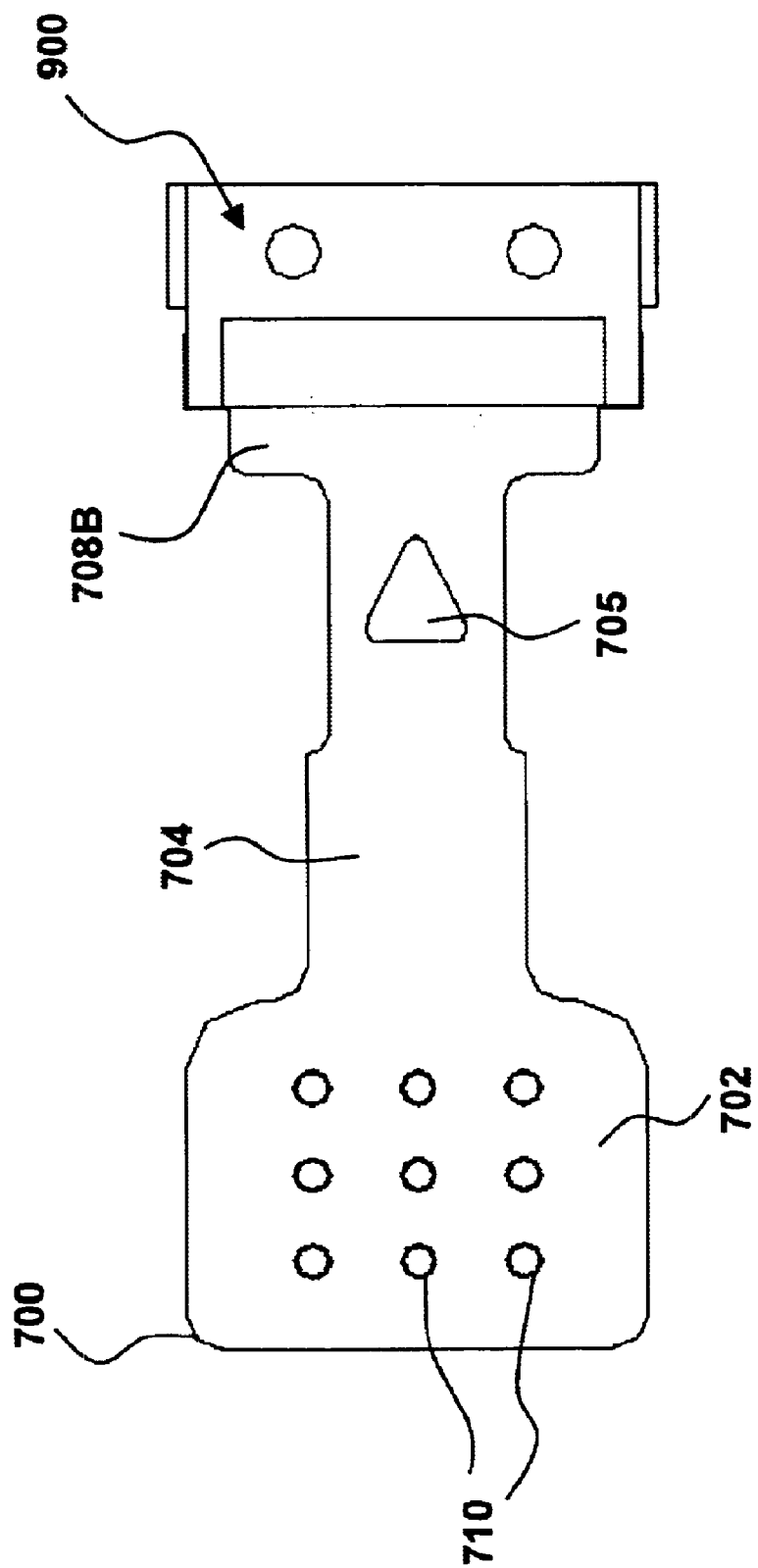
Figure 10A:
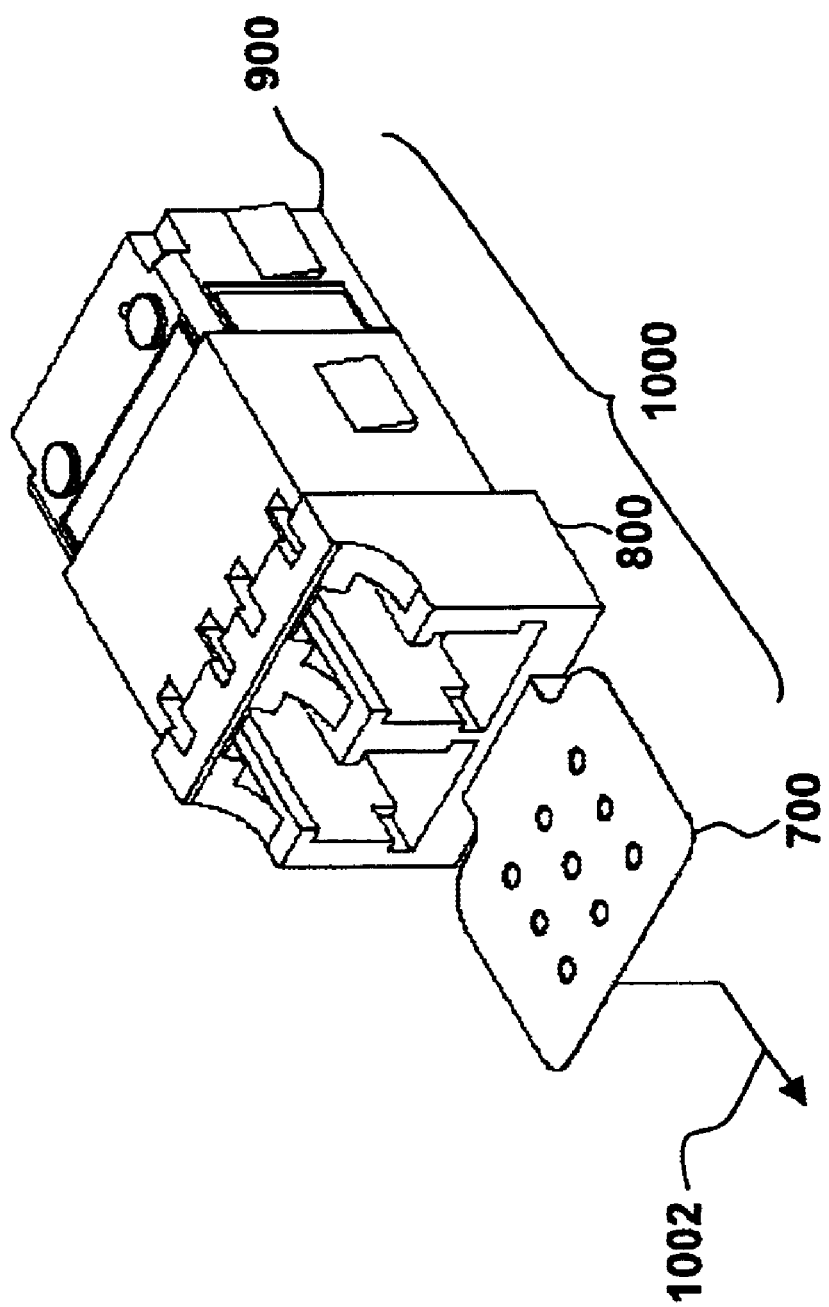
FIGS. 10A–10E are views of a subassembly of the pull-lever actuator of FIGS. 7A–7F coupled to the nose receptacle of FIGS. 8A–8E and the optical port of FIGS. 9A–9E of fiber optic modules.
Figure 10B:
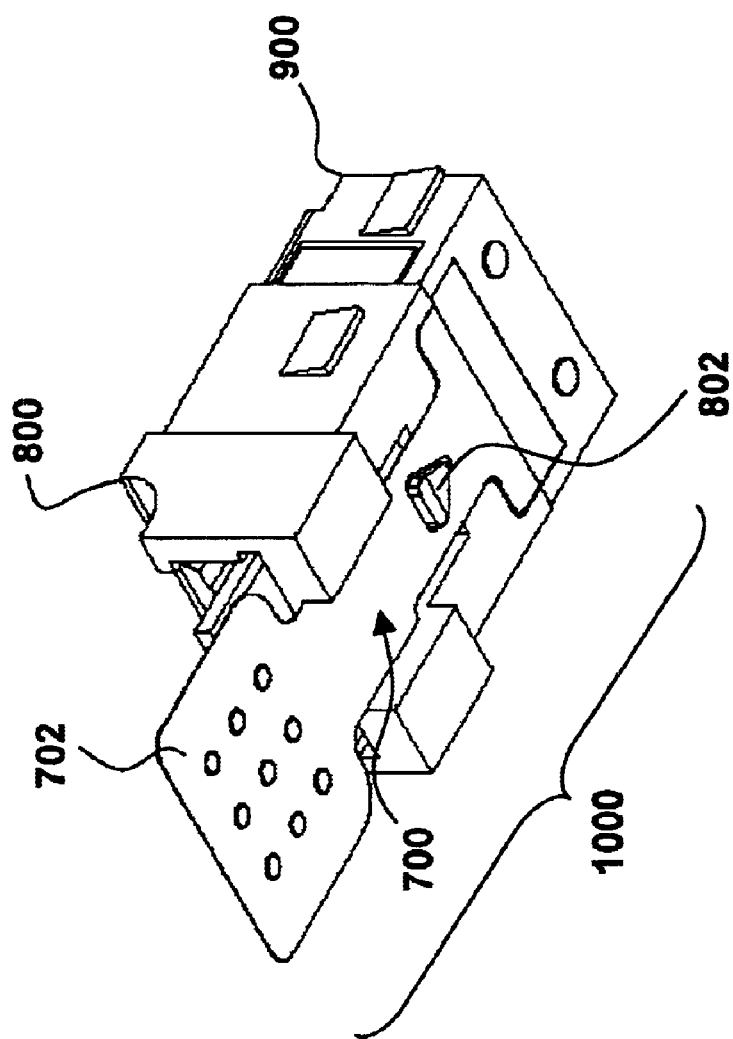
Figure 10C:
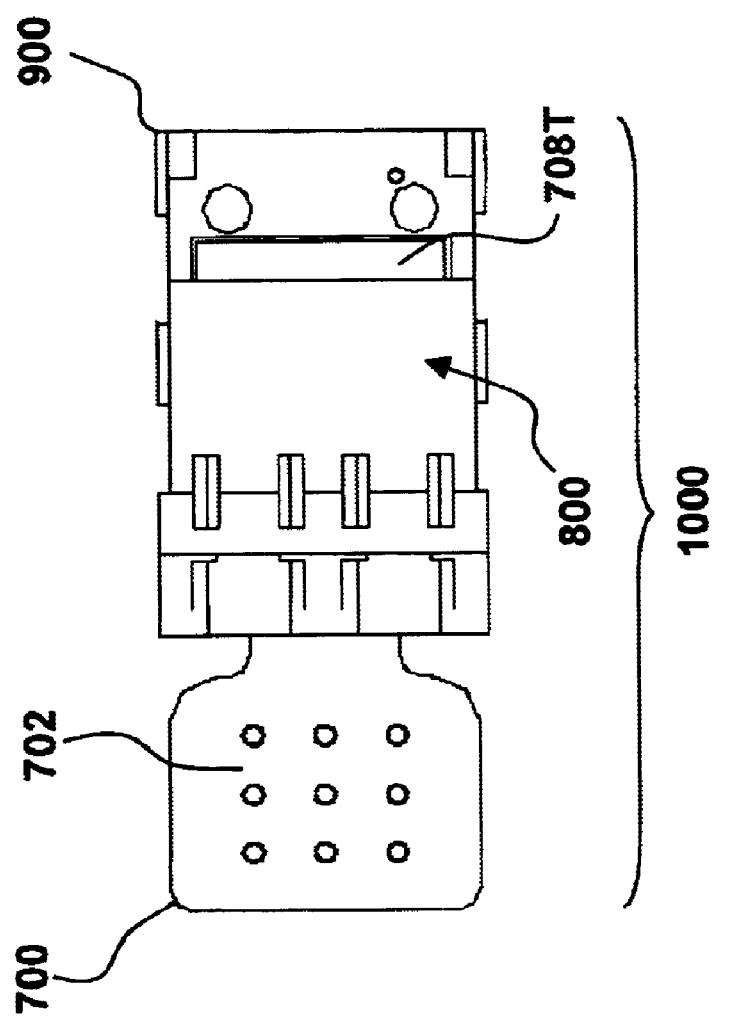
Figure 10D:
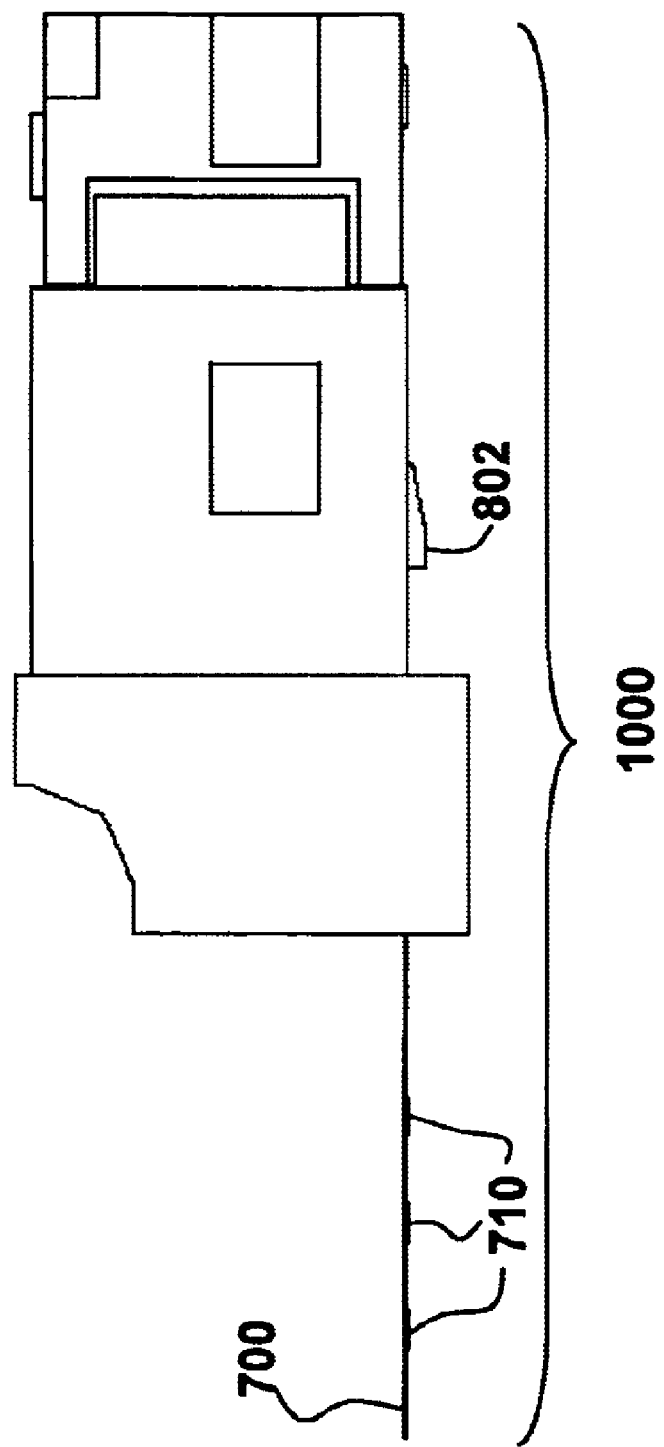
Figure 10E:
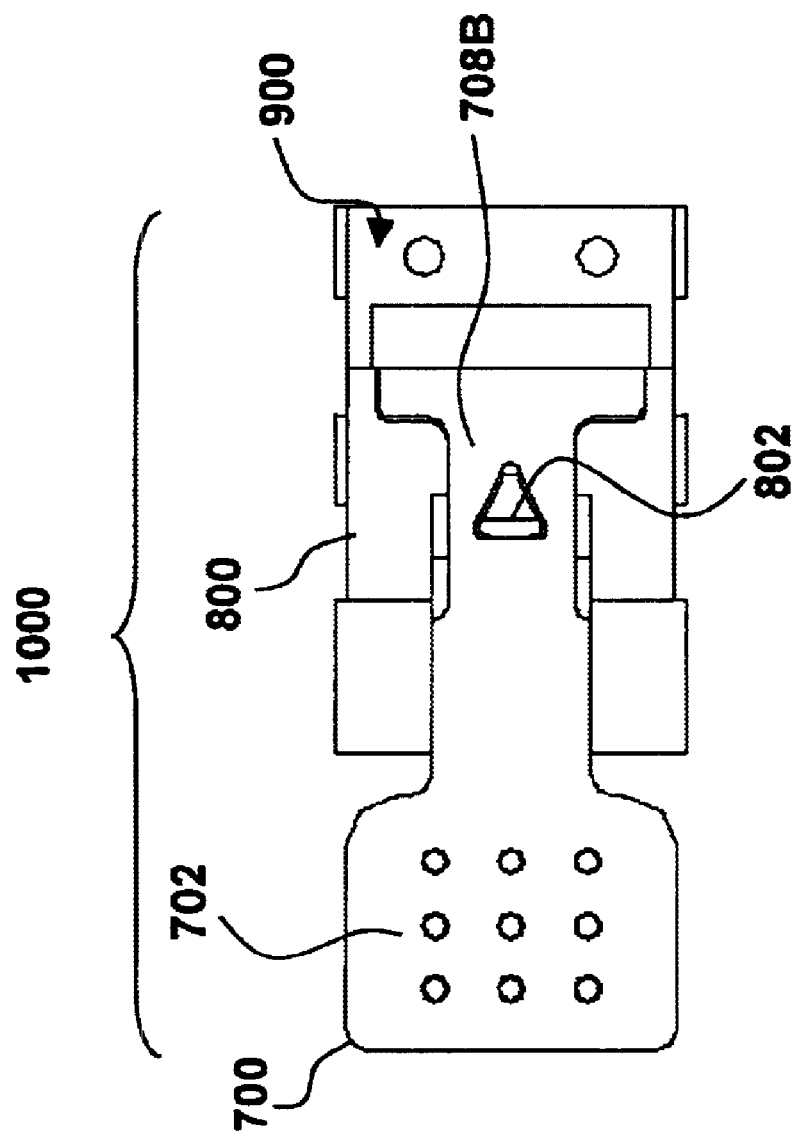

Referring now to FIG. 7B, the EMI shield 706 includes alignment pin openings 712 to allow alignment pins 804 of the nose receptacle 800 to poke through (see FIGS. 8A and 8B). The EMI shield 706 further includes a first optical opening 714 for an opto-electronic transmitter and a second optical opening 716 for an opto-electronic receiver. The second optical opening 716 for the opto-electronic receiver is typically larger to allow for an entrance angle of light or photons.

The pull-lever actuator 700 is formed out of sheet metal foil in one embodiment. In this case, it can be formed by a metal stamping process or other well known metalization process. In one embodiment, the sheet metal foil is of a substantial constant thickness with a preferred material thickness in the range from 50 to 75 micrometers. Other thickness may be used in other applications.

In one embodiment, the fiber optic module incorporating the pull-lever actuator 700 is an SFP module and the cage assembly or module receptacle is an SFP cage assembly or SFP module receptacle. Otherwise, the fiber optic module incorporating the pull-lever actuator 700 can be any type of pluggable fiber optic module.

Referring now to FIGS. 8A–8E, the nose receptacle 800 is illustrated coupled to the pull-lever actuator 700. The nose receptacle 800 is to receive fiber optic plugs having one or more fiber optic cables. The nose receptacle 800 aligns ends of the fiber optic cables with the first and second optical openings 714 and 716.

Referring now to FIGS. 9A–9E, the optical port 900 is illustrated coupled to the pull-lever actuator 700. The grounding tabs fold over the sides of the optical port 900. A receiver alignment cylinder 902 of the optical port 900 pokes through the second optical opening 716 in the pull-lever actuator 700 to align them together.

Referring now to FIGS. 10A–10E, views of an optical element subassembly 1000 of the pull-lever actuator 700, the nose receptacle 800 and the optical port 900 coupled together are illustrated. The optical subassembly 1000 does not illustrate the optical port coupled to a receiver or transmitter. The optical subassembly 1000 modifies portions of the optical element 103 of the exemplary embodiment of the fiber optic module 100. The remaining portions of the exemplary embodiment of the fiber optic module assembly are previously described herein with reference to FIGS. 1–6F. As illustrated by the arrow 1002 in FIG. 10A, a force exerted downward and outward is utilized to de-latch and unplug the fiber optic module.

Figure 11A:
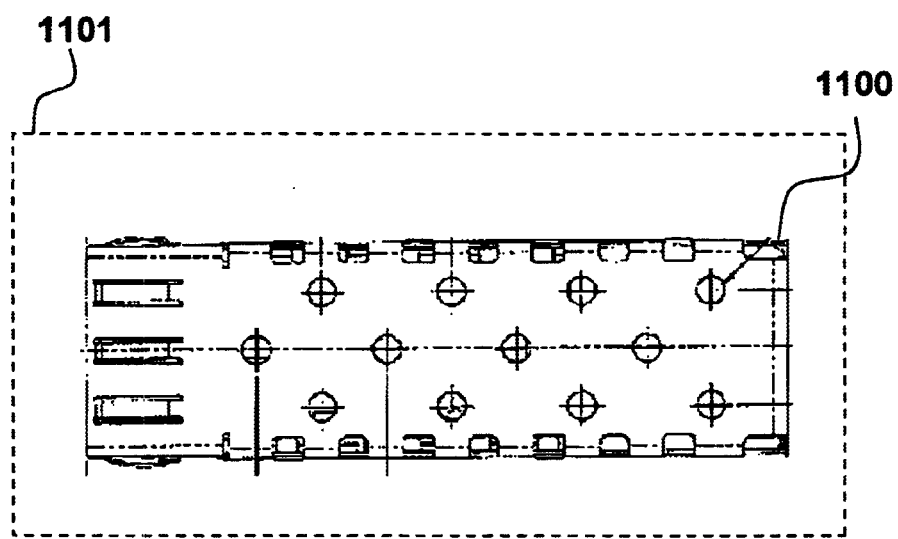
FIGS. 11A–11E are views of an exemplary cage assembly or module receptacle for fiber optic modules.
Figure 11B:
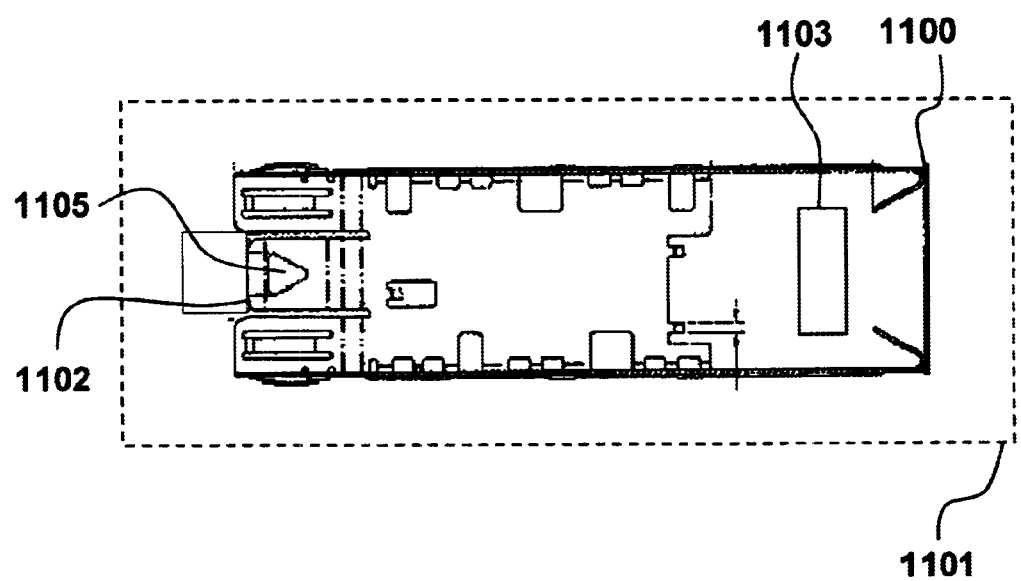
Figures 11C, 11D:
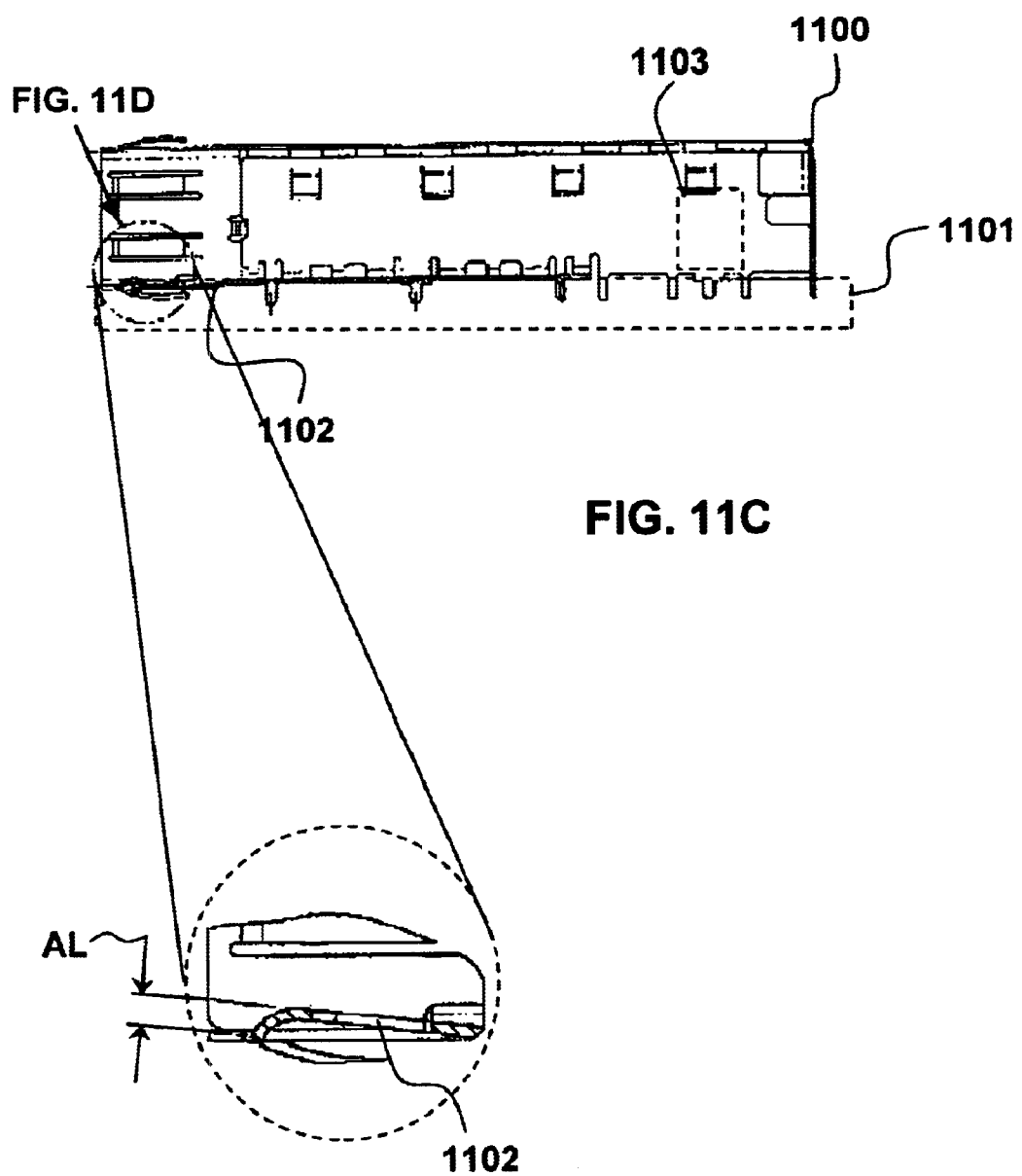
Figure 11E:
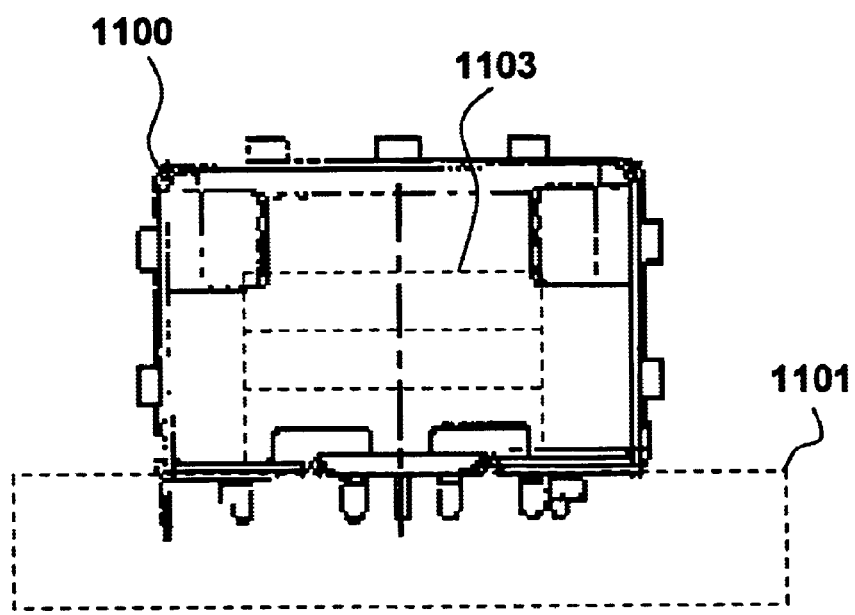

Referring now to FIGS. 11A–11E, views of an exemplary cage assembly or module receptacle 1100 for fiber optic modules is illustrated. The cage assembly or module receptacle can also be referred to simply as a cage. In FIG. 11A, a top view, the cage 1100 is coupled to a host printed circuit board 1101. In FIG. 11B, a bottom view, the latch 1102 of the cage 1100 and an electrical connector 1103 is illustrated within the perimeter of the cage 1100. The electrical connector 1103 couples to the host printed circuit board 1101. The electrical connector may include power and ground provided by the host printed circuit board 1101 as well as signal lines for bidirectional signal transfer with the host printed circuit board. In one embodiment, the electrical connector is an edge connector to couple to an edge connection of a fiber optic module. The latch 1102 includes a catch 1105 that mates with the hook 802. As illustrated in the cross sectional view of FIG. 11C and the exploded cross-sectional view of FIG. 11D, the latch 1102 is flexed downward in order to release the fiber optic module. The de-latching arm 704 of the pull-lever actuator 700 flexes the latch 1102 downward when a force is exerted downward on the pull grip 702.

Referring now to FIGS. 12A–12G, alternative embodiments to the pull grip end 702 for the pull-lever actuator 700 are illustrated. Only the pull or de-latching arm 704 portion and the pull end of the pull-lever actuator 700 is shown.

Figure 12A:
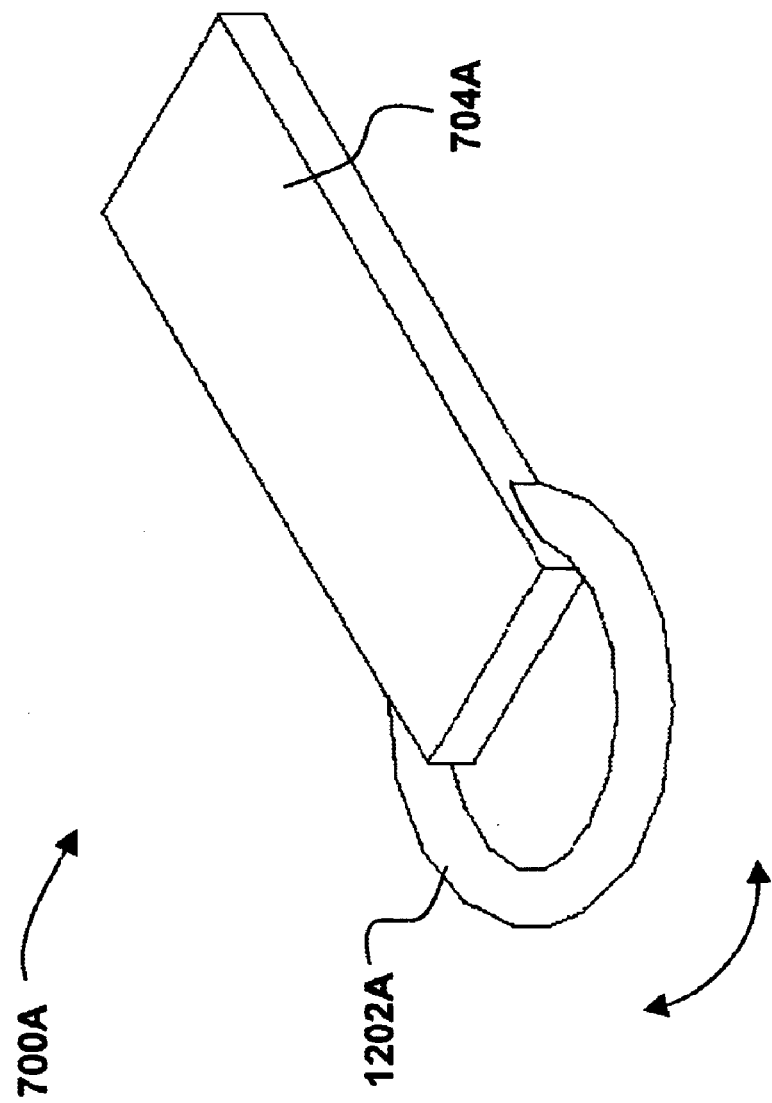

FIG. 12A shows a pull-lever actuator 700A with a pivoting pull-ring 1202A pivotally coupled to the pull-arm 704A. The direction in which the pull-ring 1202A pivots is indicated by the arrows. In this embodiment, the pull-ring 1202A is horizontal with the pull-lever actuator 700A. A user pulls down and out on the pivoting pull-ring 1202A to lever and withdraw a fiber optic module.

FIG. 12B shows a pull-lever actuator 700B with another pivoting pull-ring 1202B pivotally coupled to the pull-arm 704B. In this embodiment, the pull-ring 1202B is vertical with the pull-lever actuator 700B. The arrows indicate the direction in which the pull-ring 1202B pivots. A user pulls down and out on the pivoting pull-ring 1202B to lever and withdraw a fiber optic module.

Figure 12C:
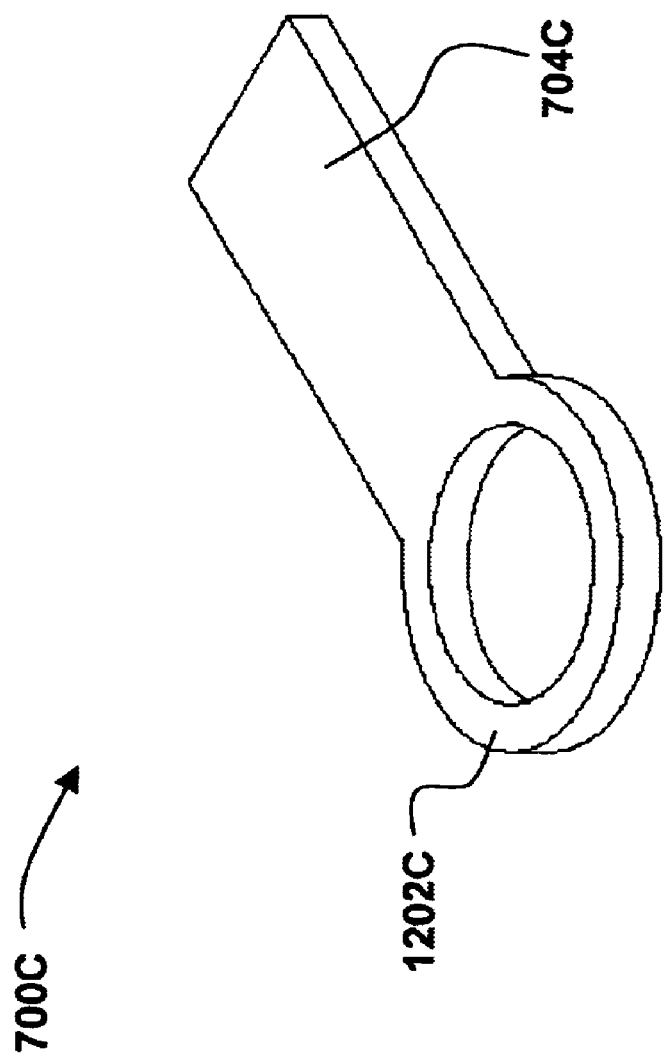

FIG. 12C shows a pull-lever actuator 700C with a fixed pull-ring 1202C coupled to the end of the pull-arm 704C. The pull-ring 1202C is horizontal with the pull-lever actuator 700C. A user pulls down and out on the pull-ring 1202C to lever and withdraw a fiber optic module.

FIG. 12D shows a pull-lever actuator 700D with another fixed pull-ring 1202D coupled to the end of the pull-arm 704D. The pull-ring 1202D is vertical with the pull-lever actuator 700D. A user pulls down and out on the pull-ring 1202D to lever and withdraw a fiber optic module.

Figure 12E:
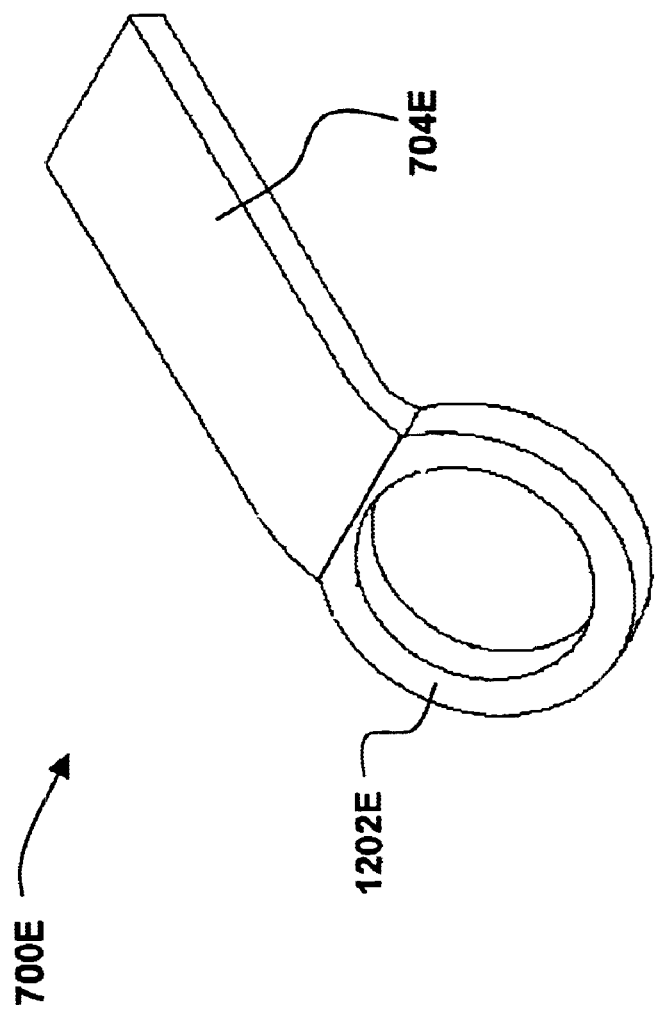

FIG. 12E shows a pull-lever actuator 700E with another fixed pull-ring 1202E coupled to the end of the pull-arm 704E. The pull-ring 1202E is at an angle to the pull-lever actuator 700E. A user pulls down and out on the pull-ring 1202E to lever and withdraw a fiber optic module.

Figure 12F:
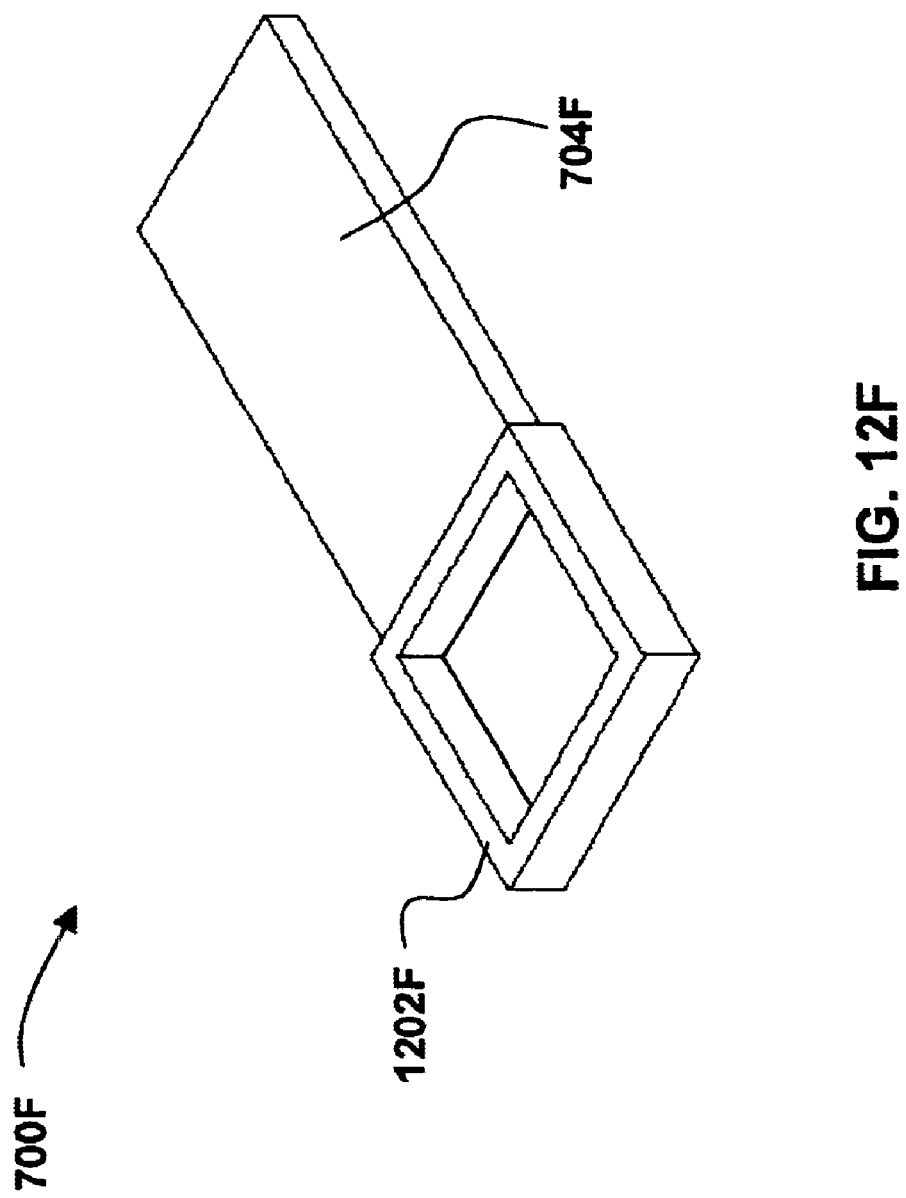

FIG. 12F shows a pull-lever actuator 700F with pull-square 1202F coupled to the end of the pull-arm 704F. The pull-square 1202F is horizontal with the pull-lever actuator 700F. A user pulls down and out on the pull-square 1202F to lever and withdraw a fiber optic module.

Figure 12G:
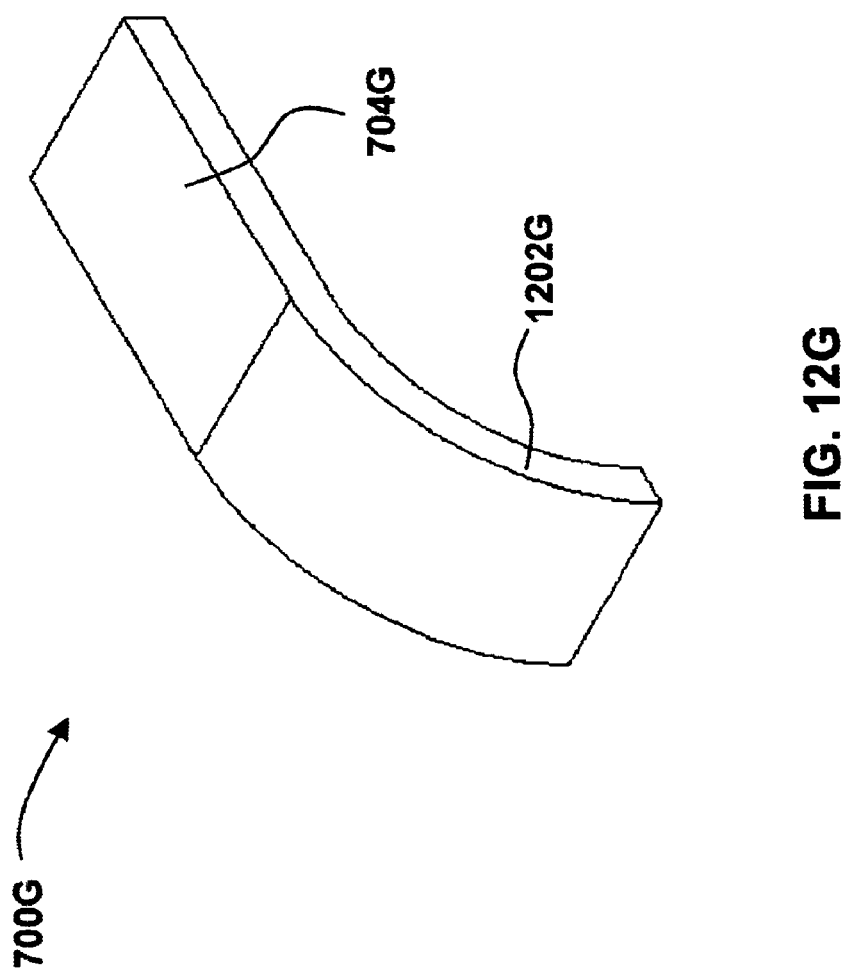

FIG. 12G shows a pull-lever actuator 700G with a pull-hook 1202G at the end of the pull-arm 704G. A user pulls down and out on the pull-hook 1202G to lever and withdraw a fiber optic module.

Figure 13:
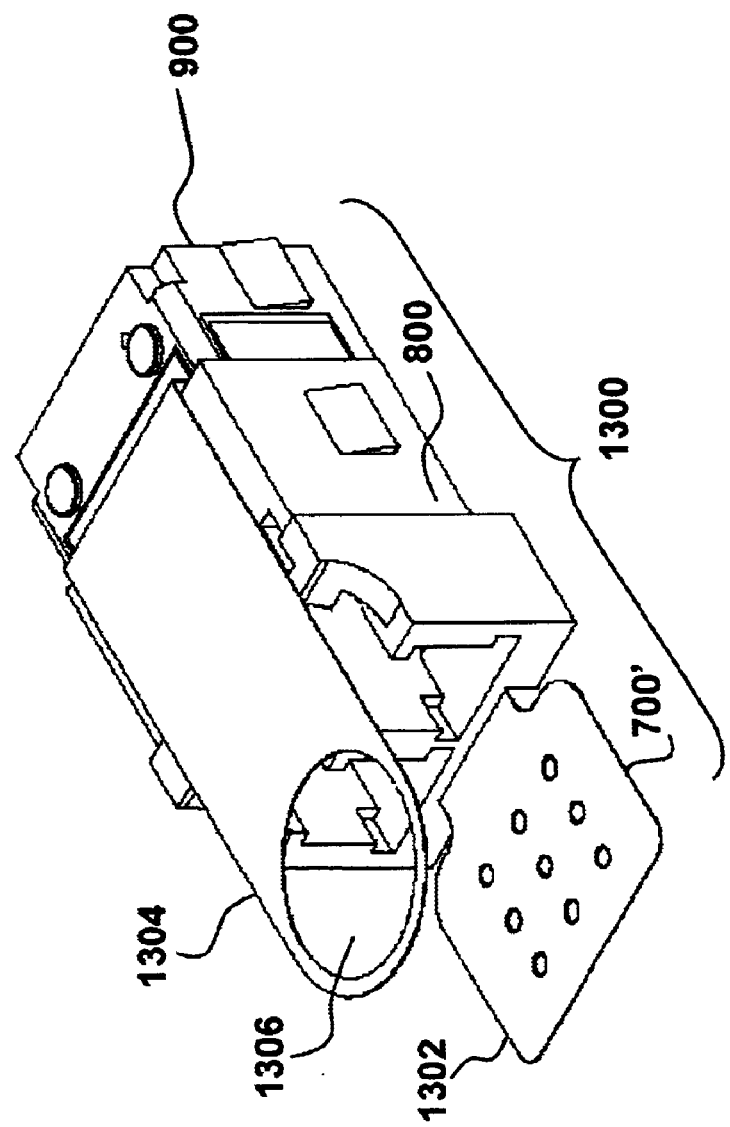
FIG. 13 is a perspective view of an alternate subassembly embodiment of a pull-lever actuator coupled to the nose receptacle and the optical port of fiber optic modules.

Referring now to FIG. 13, a perspective view of an alternate subassembly embodiment of a pull-lever actuator coupled to the nose receptacle and the optical port of fiber optic modules is illustrated. The subassembly 1300 includes an alternate embodiment of a pull-lever actuator 700', a nose receptacle 800, and an optical port 900. The pull-lever actuator 700' includes a lever 1302 and a pull arm 1304 having a pull ring 1306. A users pushes down on the lever 1302 to release a catch or hook from a latch and then pulls out on pull ring 1306 and the pull arm 1304 to withdraw the fiber optic module.

Figure 14:
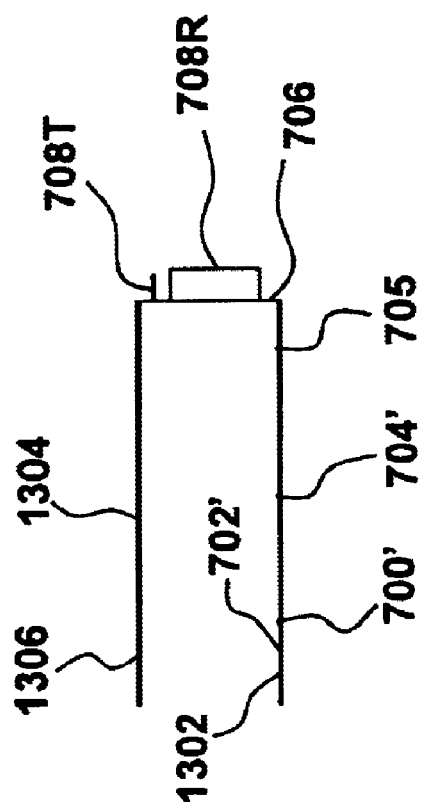
FIG. 14 is a side view of an alternate pull-lever actuator.

Referring now to FIG. 14, a side view of the alternate embodiment of the pull-lever actuator 700' is illustrated. The pull-lever actuator 700' includes the lever 1302, the pull arm 1304 having the pull ring 1306, as well as the EMI shield 706, the grounding tabs 708. The lever 1302 includes a pushable end 702', a lever arm 704', and the keyhole 705. Otherwise, the pull-lever actuator 700' has similar components to the pull-lever actuator 700. The similar components are not discussed here for reasons of brevity.

The preferred embodiments of the invention are thus described. While the invention has been described in particular embodiments, the invention should not be construed as limited by such embodiments, but rather construed according to the claims that follow below.

What is claimed is:

1. A fiber optic module comprising:
    a pull-lever actuator to disengage and withdraw the fiber optic module from a cage assembly; and
    one or more electro-optic transducers to convert optical signals into electrical signals or electrical signals into optical signals
    wherein the pull-lever actuator includes a lever arm to lever between the fiber optic module and the cage assembly for flexing the cage assembly, thereby releasing a hook of the fiber optic module from a latch of the cage assembly.

2. The fiber optic module of claim 1 wherein, the pull-lever actuator is activated to disengage and withdraw the fiber optic module by a single downward pull action.

3. The fiber optic module of claim 1, wherein the latch comprises a catch to retain the hook therein.

4. The fiber optic module of claim 1 further comprising:
    one or more electrical contacts to couple to one or more electrical contacts of a host printed circuit board.

5. The fiber optic module of claim 1 further comprising:
    an edge connection of a printed circuit board with one or more electrical contacts to couple to an edge connector of a host printed circuit board.

6. The fiber optic module of claim 1 wherein, the fiber optic module is an SFP fiber optic module and the cage assembly is an SFP cage assembly.

7. The fiber optic module of claim 1, further comprising a nose receptacle for receiving one or more optical fibers; and an optical port for supporting the one or more electro-optic transducers; wherein, the pull-lever actuator includes an EMI shield extending from the lever arm between the nose receptacle and the optical port to contain EMI emissions.

8. The fiber optic module of claim 1 wherein, the pull-lever actuator includes:
    a pull grip,
    a lever arm coupled to the pull grip,
    an EMI shield coupled to the lever arm, and
    grounding tabs coupled to the EMI shield.

9. The fiber optic module of claim 1 wherein, the pull-lever actuator includes a pull grip having dimples to prevent slippage of a user's grip on the pull-lever actuator.

10. The fiber optic module of claim 1 wherein, the pull-lever actuator includes a pull ring to allow a user's finger to pull down and out on the pull-lever actuator.

11. The fiber optic module of claim 1 wherein, the pull-lever actuator is formed of a conductive material.

12. The fiber optic module of claim 11 wherein, the pull-lever actuator is formed of metal.

13. The fiber optic module of claim 1, wherein:
    the one or more electro-optic transducers includes a first electro-optic transducer and a second electro-optic transducer,
    the first electro-optic transducer to convert optical signals into electrical signals, and
    the second electro-optic transducer to convert electrical signals into optical signals.

14. The fiber optic module of claim 1 further comprising:
    a printed circuit board, the one or more electro-optic transducers coupled to the printed circuit board; and
    a housing over the printed circuit board and the one or more electro-optic transducers.

15. The fiber optic module according to claim 1, wherein the pull-lever actuator includes a hole through which the catch extends.

16. A pull-lever actuator for fiber optic modules having one or more electro-optic transducers, the pull-lever actuator comprising:

a pull grip to allow a user to grin a first end of the pull-lever actuator;

a lever arm coupled to the pull grip, the lever arm to lever between the fiber optic module and a cage assembly to flex the cage and release a hook of the fiber optic module from a latch of the cage assembly;

an EMI shield coupled to the lever arm at a second end of the pull-lever actuator, the EMI shield to contain EMI emissions; and grounding tabs coupled to the EMI shield, the grounding tabs to provide a grounding link between the EMI shield and the cage assembly.

17. The pull-lever actuator of claim 16 wherein, the pull-lever actuator is activated to disengage and withdraw the fiber optic module from the cage assembly by a single downward pull action.

18. The pull-lever actuator of claim 16 wherein, the pull grip has dimples.

19. The pull-lever actuator of claim 16 wherein, the pull-lever actuator is formed of metal.

20. The pull-lever actuator of claim 16 wherein, the fiber optic module is an SFP fiber optic module and the cage assembly is an SFP cage assembly.

21. The pull-lever actuator of claim 16, wherein the fiber optic module includes: a nose receptacle for receiving one or more optical fiber; and an optical port for supporting the one or more optical fibers; and wherein the EMI shield extends from the lever arm between the nose receptacle and the optical port to contain EMI emissions.

22. A method to withdraw a fiber optic module including a hook from a cage including a latch, the method comprising:

providing a pull-lever actuator for the fiber optic module extending between the fiber optic module and the cage;

pushing down on an end of the pull-lever actuator to flex the cage, thereby releasing the hook from the latch; and pulling out on the end of the pull-lever actuator to withdraw the fiber optic module from the cage.

23. The method of claim 22 wherein, the fiber optic module includes a hook to engage the catch of the latch of the cage when inserted therein and the pushing down of the end of the pull-lever actuator levers the latch so the catch is disengaged from the hook.

24. The method of claim 22 wherein, the pushing down and pulling out on the end of the pull-lever actuator is by one motion.

25. A method to withdraw a fiber optic module with a hook extending therefrom from a cage with a latch thereon, the method comprising:

providing a lever actuator extending between the fiber optic module and the cage, and a pull actuator for the fiber optic module;

pushing down on an end of the lever actuator to flex the latch, thereby releasing the hook from the latch; and pulling out on an end of the pull actuator to withdraw the fiber optic module from the cage.

26. The method of claim 25 wherein:

the fiber optic module includes a hook to engage the catch of the latch of the cage when inserted therein; and the pushing down of the end of the lever actuator levers the latch so the catch is disengaged from the hook.

27. The method of claim 25 wherein, the pulling out on the end of the pull actuator withdraws the fiber optic module.

28. A fiber optic module comprising:

a lever actuator to disengage the fiber optic module from a cage assembly;

a pull actuator to withdraw the fiber optic module from the cage assembly; and one or more electro-optic transducers to convert between optical signals and electrical signals;

wherein the lever actuator includes a lever arm to lever between the fiber optic module and the cage assembly for flexing the cage assembly, thereby releasing a hook of the fiber optic module from a latch of the cage assembly.

29. The fiber optic module of claim 28 wherein, the lever actuator to lever a latch of a cage and to release a catch of the fiber optic module.

30. The fiber optic module of claim 29 wherein, the catch to engage the latch of the cage to retain the fiber optic module therein.

31. The fiber optic module of claim 28 further comprising: an edge connection of a printed circuit board with one or more electrical contacts to couple to an edge connector of a host printed circuit board.

32. The fiber optic module of claim 28 wherein, the fiber optic module is an SFP fiber optic module which can be inserted and withdrawn from an SFP cage.

33. The fiber optic module of claim 28 wherein, the pull actuator for a user to pull out on the fiber optic module and to withdraw it from a cage.

34. The fiber optic module of claim 28 further comprising:

a printed circuit board, the one or more electro-optic transducers coupled to the printed circuit board; and a housing over the printed circuit board and the one or more electro-optic transducers.

35. The fiber optic module of claim 28, wherein:

the one or more electro-optic transducers includes a first electro-optic transducer and a second electro-optic transducer, the first electro-optic transducer to convert optical signals into electrical signals, and the second electro-optic transducer to convert electrical signals into optical signals.

* * * * *

UNITED STATES PATENT AND TRADEMARK OFFICE
CERTIFICATE OF CORRECTION

PATENT NO. : 6,942,395 B1
DATED : September 13, 2005
INVENTOR(S) : Chuan et al.

It is certified that error appears in the above-identified patent and that said Letters Patent is hereby corrected as shown below:

Column 3,
Line 58, "module 100 is by" should read -- module 100 by --.

Column 6,
Line 13, "a Lop 347" should read -- a top 347 --.

Column 7,
Line 12, "top 3417" should read -- top 347 --.

Column 17,
Line 4, "to grin a first" should read -- to grip a first --.
Line 31, "or more optical fibers" should read -- or more electro-optic transducers --.

Signed and Sealed this

Seventh Day of February, 2006

JON W. DUDAS
*Director of the United States Patent and Trademark Office*